Oct. 2, 1951     A. C. DE BEAUREGARD     2,569,657
WINDING MACHINE

Filed Sept. 28, 1949     16 Sheets-Sheet 1

INVENTOR.
AMÉDÉE COSTA DE BEAUREGARD
BY John H Graham
HIS AGENT.

Oct. 2, 1951  A. C. DE BEAUREGARD  2,569,657
WINDING MACHINE
Filed Sept. 28, 1949  16 Sheets-Sheet 2

INVENTOR.
AMÉDÉE COSTA DE BEAUREGARD
BY John Graham
HIS AGENT

Oct. 2, 1951  A. C. DE BEAUREGARD  2,569,657
WINDING MACHINE
Filed Sept. 28, 1949  16 Sheets-Sheet 3

INVENTOR.
AMÉDÉE COSTA DE BEAUREGARD
BY John Graham
HIS AGENT.

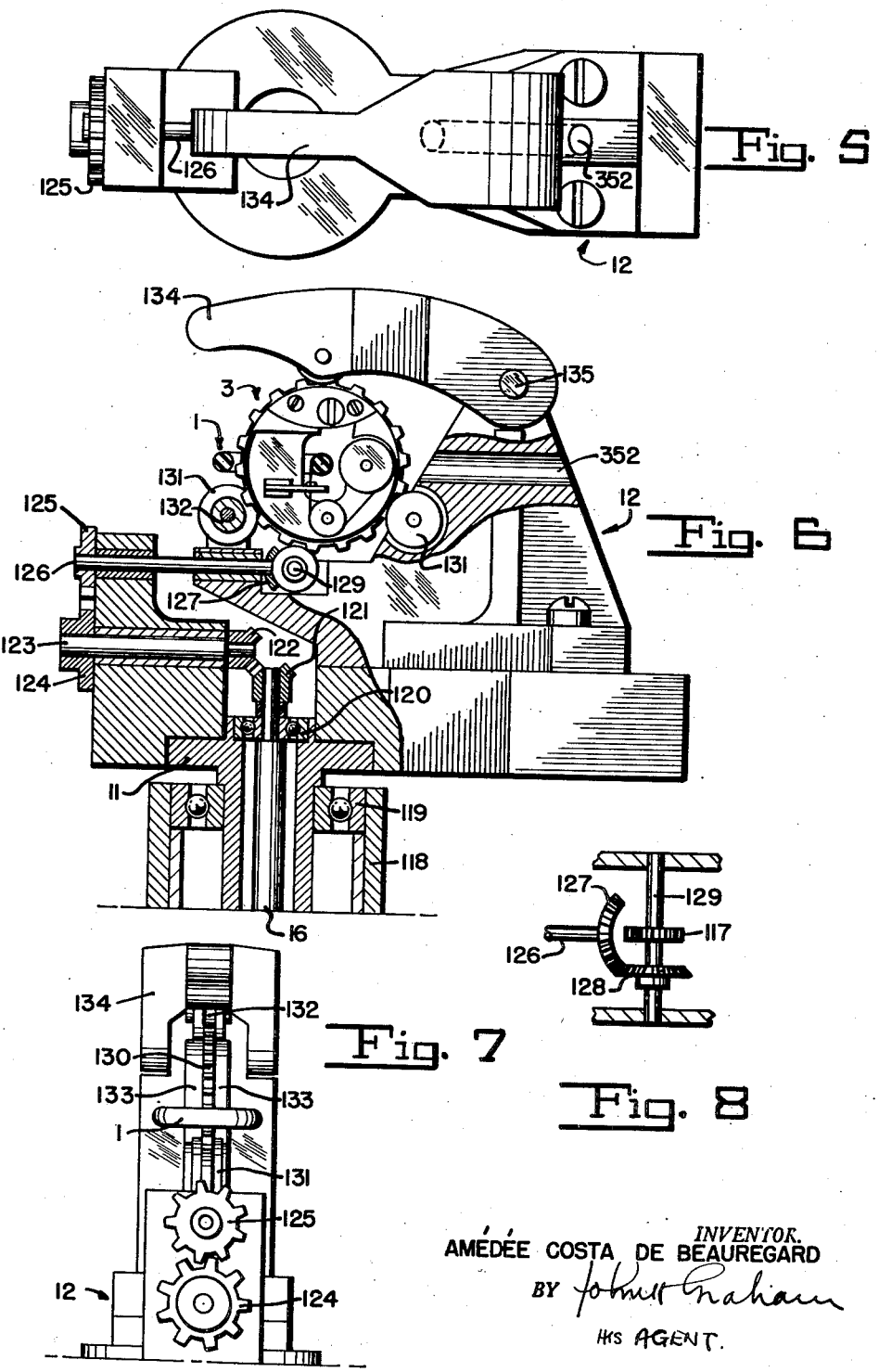

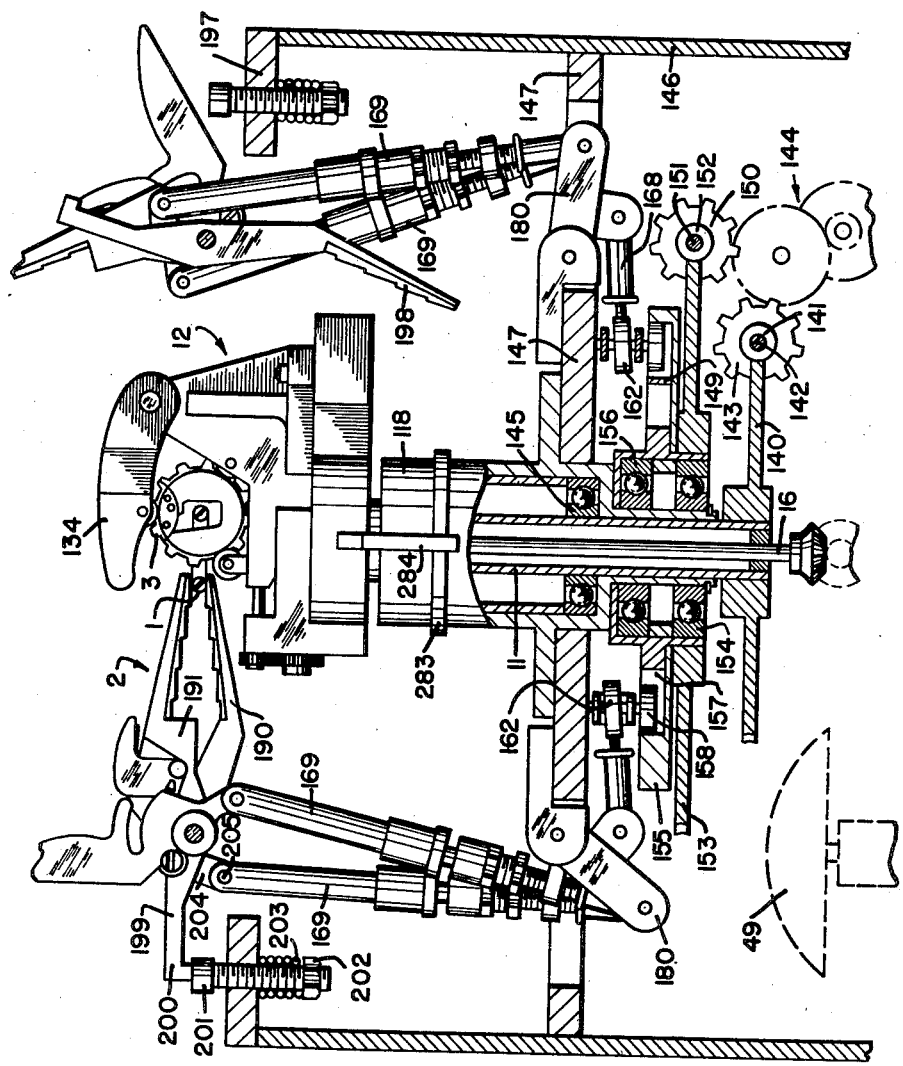

Oct. 2, 1951 A. C. DE BEAUREGARD 2,569,657
WINDING MACHINE
Filed Sept. 28, 1949 16 Sheets-Sheet 6

INVENTOR.
AMÉDÉE COSTA DE BEAUREGARD
BY John H Graham
HIS AGENT.

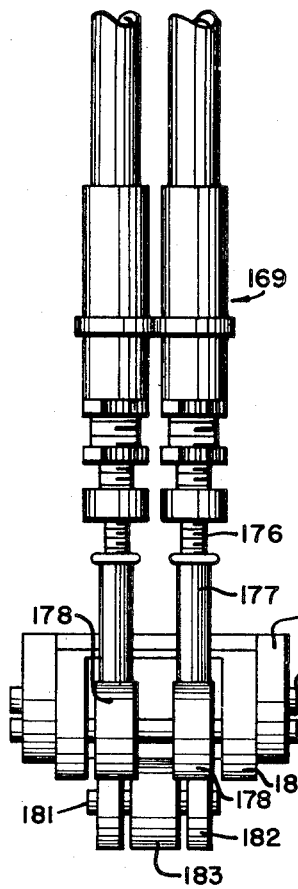

Oct. 2, 1951 A. C. DE BEAUREGARD 2,569,657
WINDING MACHINE
Filed Sept. 28, 1949 16 Sheets-Sheet 9
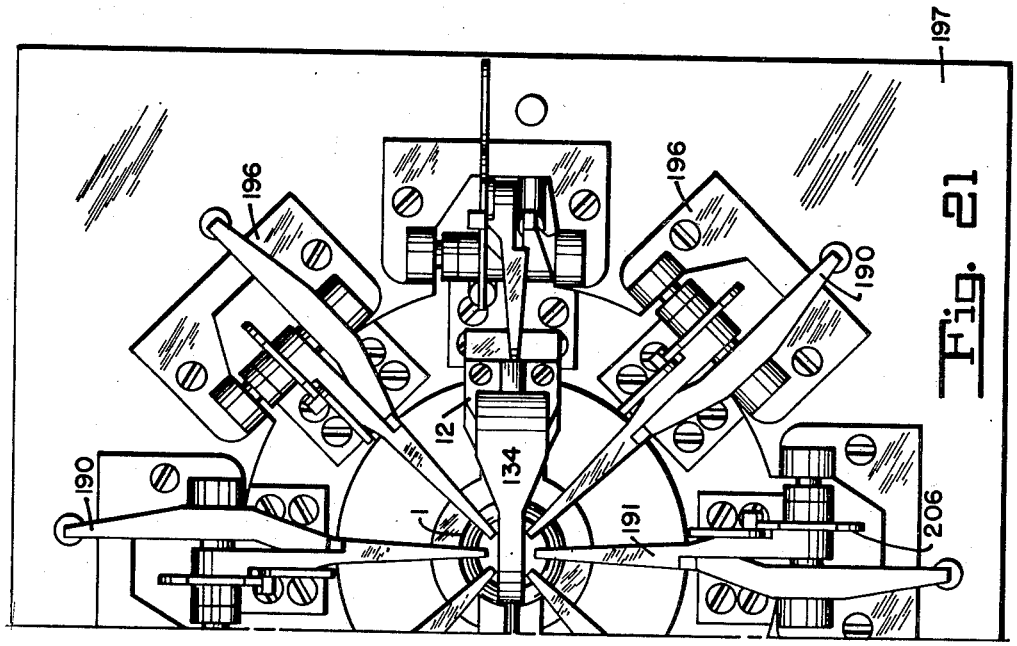
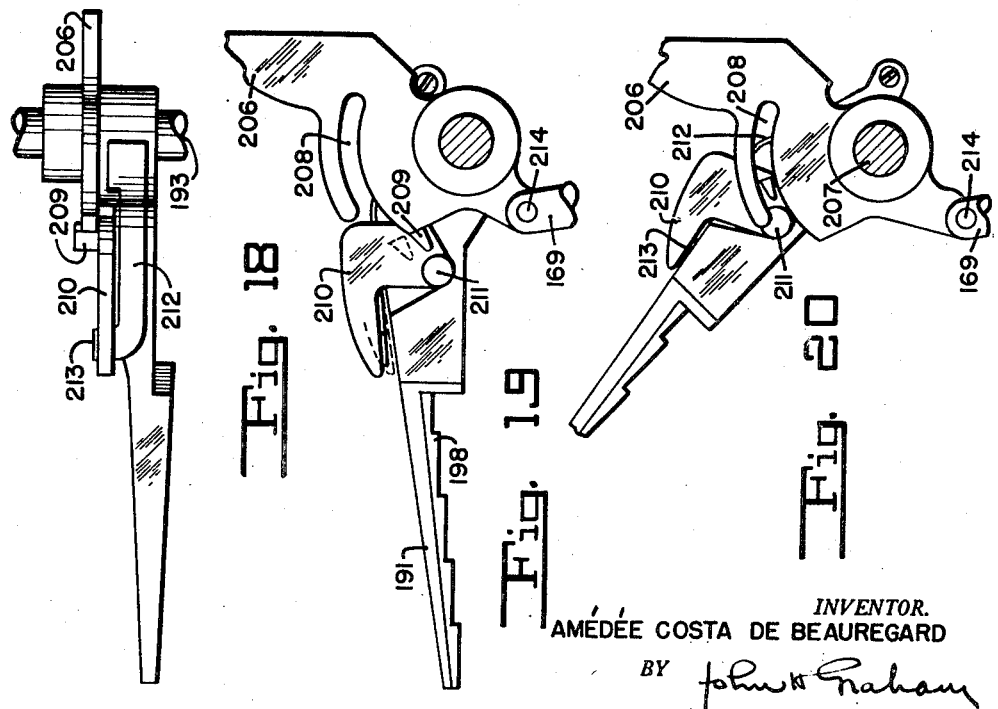
INVENTOR.
AMÉDÉE COSTA DE BEAUREGARD
BY John H. Graham
HIS AGENT.

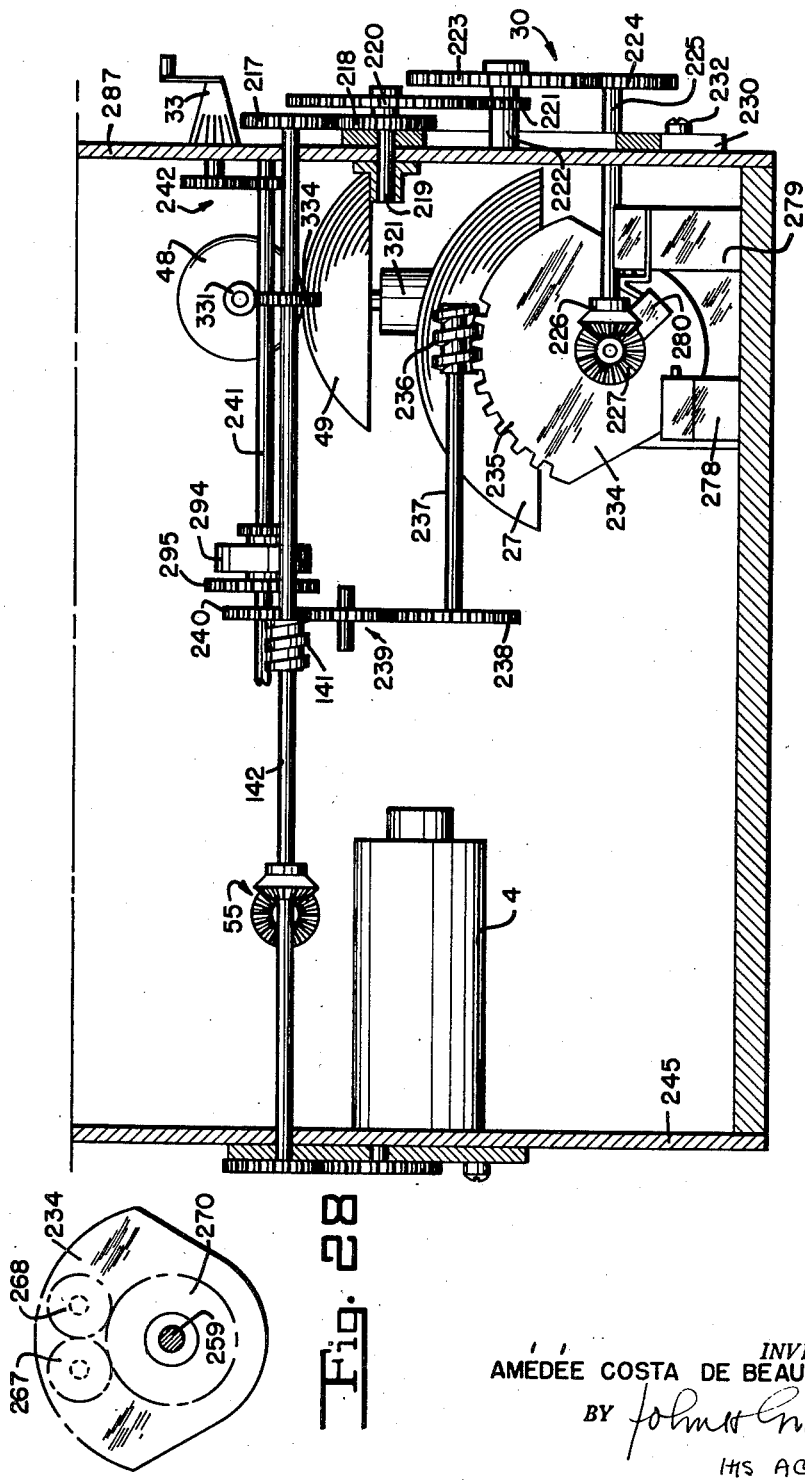

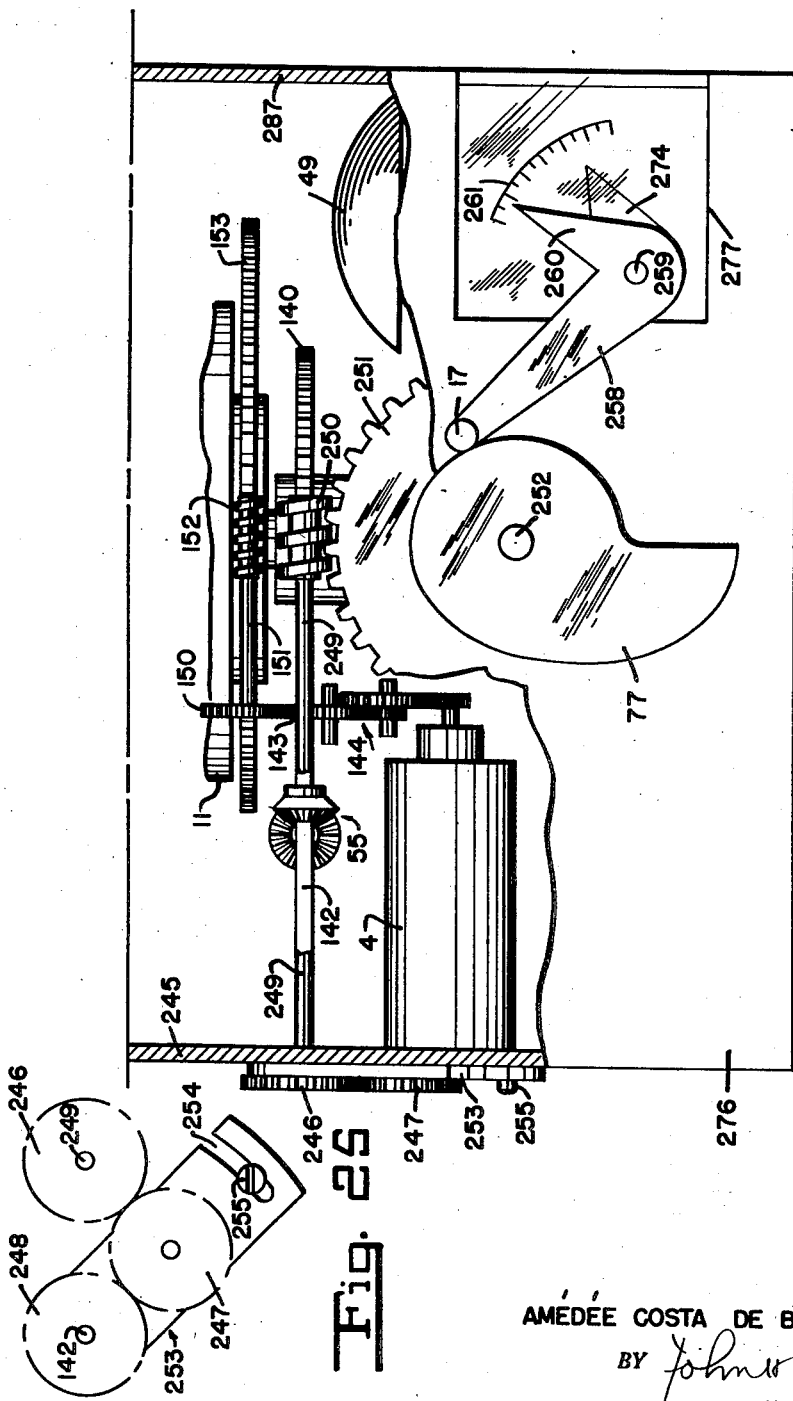

Oct. 2, 1951 A. C. DE BEAUREGARD 2,569,657
WINDING MACHINE
Filed Sept. 28, 1949 16 Sheets-Sheet 12

INVENTOR.
AMÉDÉE COSTA DE BEAUREGARD
BY
John H Graham
HIS AGENT.

Oct. 2, 1951     A. C. DE BEAUREGARD     2,569,657
WINDING MACHINE
Filed Sept. 28, 1949                                    16 Sheets-Sheet 13
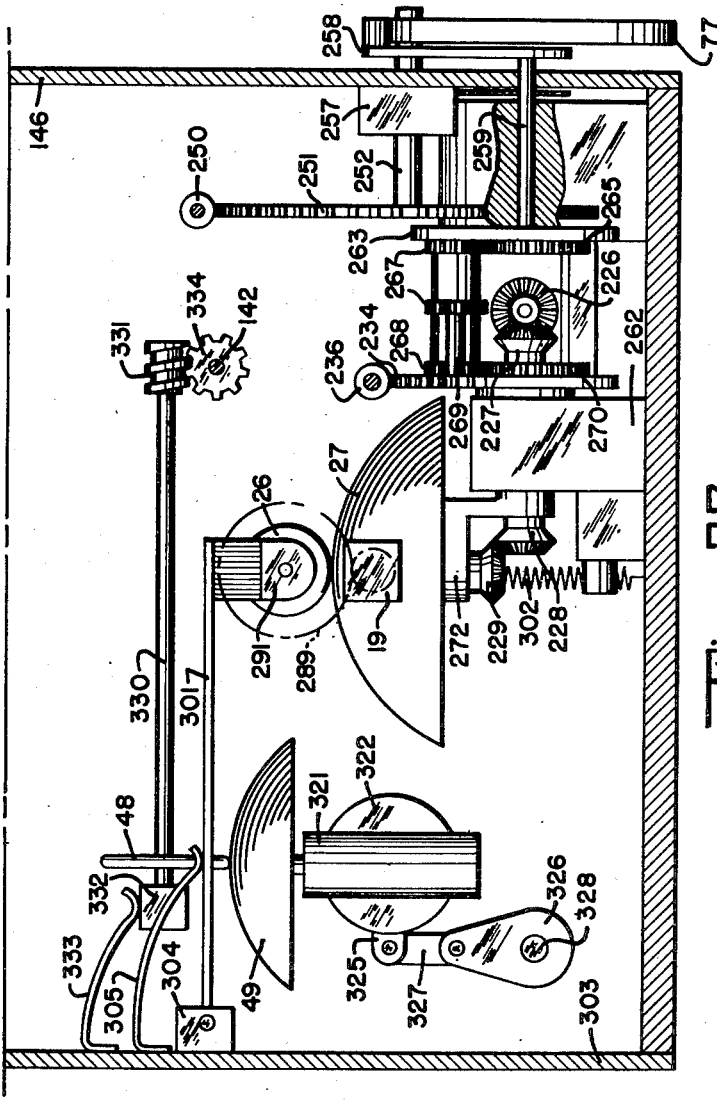
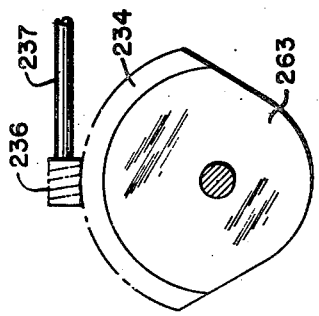
INVENTOR.
AMEDEE COSTA DE BEAUREGARD
BY John H. Graham
HIS AGENT.

Oct. 2, 1951 A. C. DE BEAUREGARD 2,569,657
WINDING MACHINE
Filed Sept. 28, 1949 16 Sheets-Sheet 15

INVENTOR.
AMÉDÉE COSTA DE BEAUREGARD
BY John Graham
HIS AGENT.

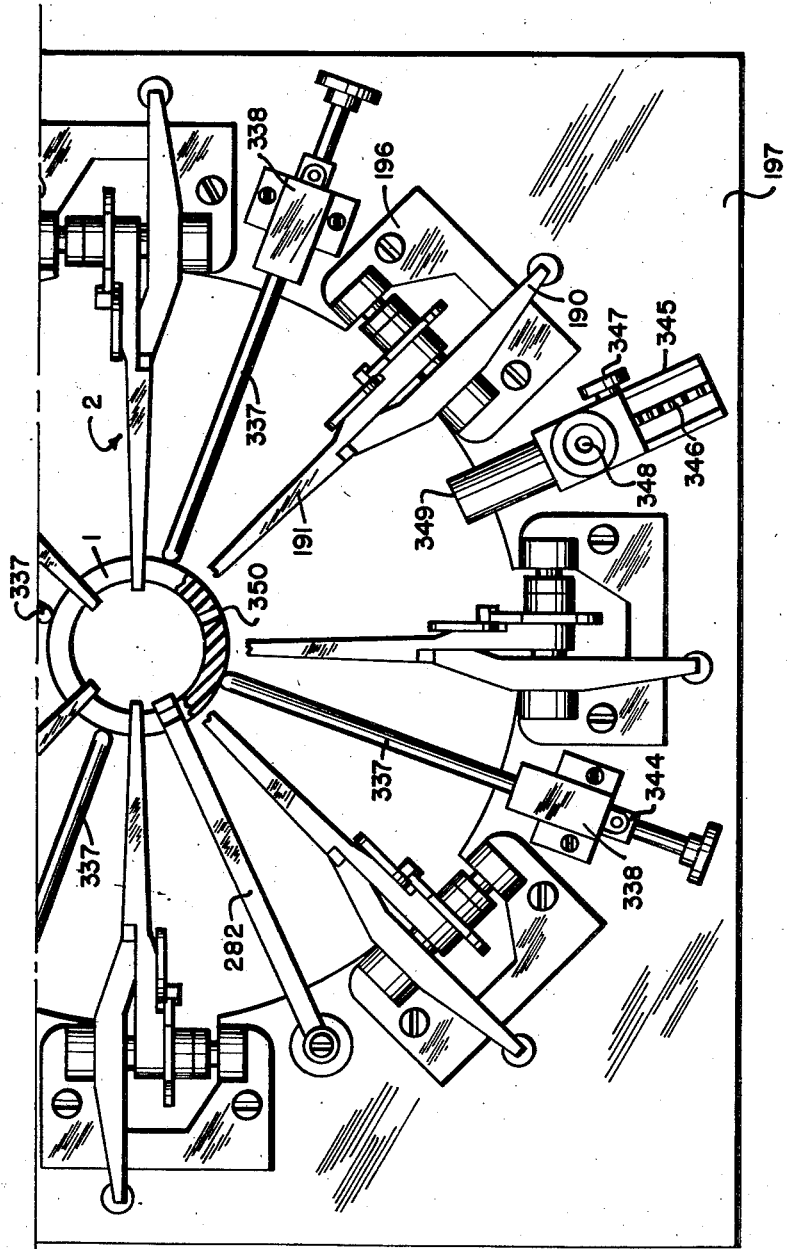
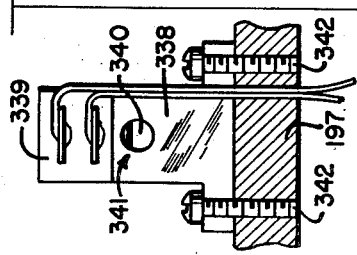

Patented Oct. 2, 1951

2,569,657

UNITED STATES PATENT OFFICE 2,569,657

WINDING MACHINE

Amédée Costa de Beauregard, Syosset, N. Y., assignor to Specialties, Inc., Syosset, N. Y., a corporation of New York Application September 28, 1949, Serial No. 118,421

32 Claims. (Cl. 242—4)

The present invention relates to methods and apparatus for winding forms with filamentary material and more specifically to a winding machine for producing wire-wound forms to be ultimately made into precision electrical components of various types.

Heretofore, wound coils of wire on supporting forms have been prepared by various methods using many systems and forms of apparatus with the object of obtaining very accurately wound electrical components which can pass tests of very close tolerances. There are many factors that may occur which can affect the accuracy of a finished product. For example, whether the component is of linear or non-linear characteristics, the angular spacing of the individual coils or turns of wire on the form is extremely critical, and a very minute error in spacing, particularly if reoccurent, can be sufficient to cause rejection of a wound component of the type with which the invention is concerned, because it does not answer the high degree of accuracy and precision required for many uses of such components.

The present invention is concerned specifically, but not exclusively, with wire wound electrical cores or forms having linear or non-linear patterns of resistance, reactance or similar electrical characteristics which can be utilized for ultimate assembly as an adjustable-value component, such as a rheostat or potentiometer which devices are used for example in control circuits and in similar electrical systems where the conditions require an accurate and precise component.

The present invention is also specifically concerned with cores or like forms wound with wire under accurate control of the number of turns wound in a predetermined angular space, which may be 360 degrees, which coils can be used for many purposes in forming electrical components, for example, the field windings of electrical synchro units.

Hereinafter, reference will be specifically made to the winding of forms to be used as precise potentiometers, as exemplary of one form of component which can be made by using a form wound with wire under the precise control of the machine according to this invention, but it is to be understood that the invention is in no way limited to providing means and methods for producing wound forms suitable for potentiometers, and equivalent wire wound forms for other electrical components are intended to be within the purview of the present invention.

It is an object of the present invention to provide a new and useful winding machine for producing wound forms of the type described having precise control of speed of winding and angular spacing of the filaments being wound on the form.

It is another object of the present invention to provide a winding machine of the type defined so arranged, constructed and adapted to operate that it will produce a wound form for the kind of uses defined, under the most precise control of tensioning, spacing and uniformity.

It is another object of the invention to provide a winding machine of the type defined which will produce an accurate precision wound form of linear characteristics, and will uniformly produce duplicates of such wound form, the machine being capable of minute or incremental changes while still operating through its winding cycle, to permit for correction of detected errors during winding.

It is another object of the present invention to provide a winding machine on which forms may be wound with accuracy, precision and uniformity of non-linear characteristics.

Other objects of the present invention will be obvious from the hereinafter described mechanism and its manner of functioning, taken in conjunction with the accompanying drawings, in which:

Figure 5 is a plan view of the revolving head of the machine according to the present invention which is adapted to be angularly rotated about the form to be wound;

Figure 6 is a side-view of the head of Fig. 5, with parts in section for clarity;

Figure 7 is a front view of the head of Fig. 5;

Figure 8 is an enlarged view of some of the gearing used in the head of Fig. 5 for rotating the shuttle of the machine on its axis bodily;

Figure 9 is an enlarged detail view of part of the head of Fig. 5;

Figure 10 is a rear view of the detail of Fig. 9;

Figure 11 is side-elevation of the top half of the machine according to the invention, parts being in section and other parts being omitted or cut away for clarity;

Figure 15 is a rear view, partly cut away, of the finger operating arms of Fig. 11;

Figures 16 and 17 are detailed side views, in partial section, of the arms of Fig. 15, in different operating positions.

Figures 18, 19 and 20 are enlarged views of a detail of the upper fingers of the grippers of Fig. 11, which hold the form or core secure during winding;

Figure 21 is a plan view of one half of the machine of Fig. 11;

Figure 23 is a left hand side view of the lower part of the machine of Fig. 11, with parts of the apparatus removed, for a clear understanding of the invention;

Figure 24 is a view similar to Fig. 23 but with other parts added, to show the operation of the machine;

Figure 25 is a detailed schematic view of the gearing shown on the left hand side of Fig. 24;

Figure 27 is a view of the lower part of the machine of Fig. 11 from the rear thereof with parts in section;

Figure 28 (sheet 9) is a detailed diagrammatic view of gearing shown in Figs. 23 and 27;

Figure 29 (sheet 12) is a detailed diagrammatic view of the other side of the gearing of Fig. 28;

Figure 43:
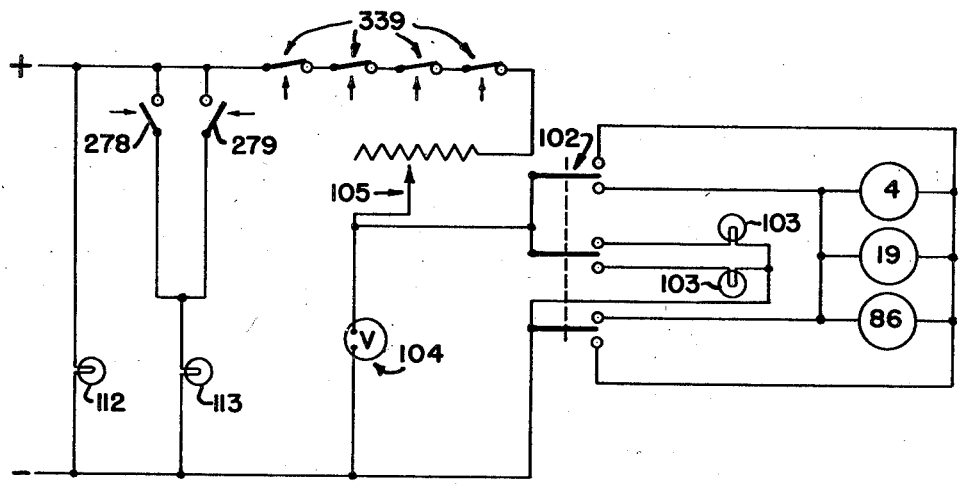
Figure 30:
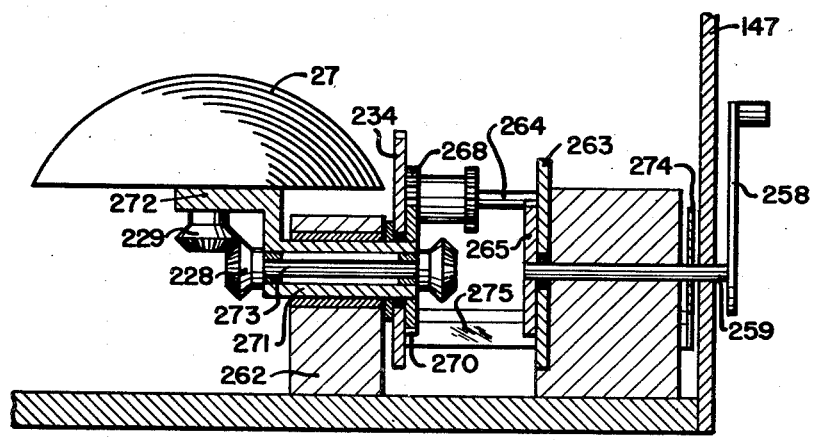
Figure 30 is a detail in section of certain operating parts of the machine, as illustrated in Fig. 27, showing the operation of the dome and rider used for shuttle speed control axially.
Figure 33:
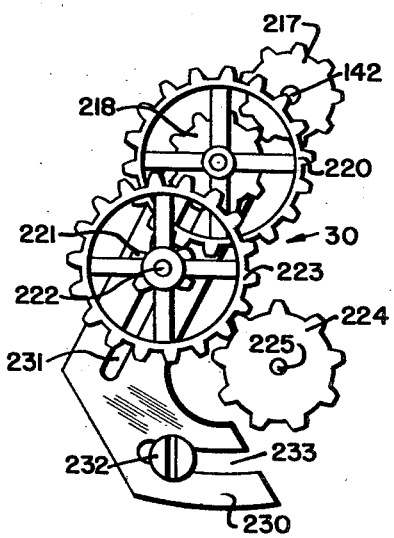

Figures 31 and 32 (sheet 7) are enlarged views of details associated with Figs. 11 and 41, showing the electrical resistance pick-off from the form being wound, during its winding cycle;

Figure 33 is an enlarged detail of the gearing in front of the machine, on the right of Fig. 23, for rotating the dome of Fig. 30;

Figures 34 to 40 are views of the winding shuttle mechanism for use in the winding machine according to the invention, including enlarged details thereof;

Figure 41 is a plan view of the machine similar to the view of Fig. 21, but showing modifications of the apparatus;

Figure 42 is a side detail, enlarged, of a cut-out switch shown in plan in Fig. 41; and Figure 43 (sheet 13) is a wiring diagram of the machine according to the present invention, as a whole.

Generally, in practicing the present invention there is provided a shuttle carrying a supply of wire or like filamentary material to be wound on a shaped form, which shuttle is adapted to be rotated both bodily angularly around the form and on its axis, whereby to angularly space turns of the wire on the form in a pattern which will be determined by the relationship of the speeds of the two planes of rotation of the shuttle.

The form upon which the wire is wound is firmly held by a number of grippers, preferably having co-operating upper and lower fingers between which the form is held. The grippers are so arranged that progressively they can be removed from the path of travel of the shuttle bodily as it revolves angularly about the form, without disturbing the remaining grippers, so that the form is held securely at all times during the winding cycle.

Speed governor means are provided to individually control the speed of rotation of the shuttle on its axis, whereby to alter the angular spacing of the coils of wire and preferably an infinitely variable speed ratio control device is used formed of a rotating dome and a friction riding disc thereon, the disc being also rotated, to reduce or eliminate slippage.

It is a feature of the invention that the grippers holding the form are removed in succession from the path of the head or like means holding the shuttle and rotating same bodily around a vertical axis by means of a cam and cooperating cam followers, the cam turning in synchronism with the head but being separately driven from a prime mover common to the drive for the cam, for the head and for the shuttle axially, whereby any shock of the cam action in opening or otherwise removing the grippers from the path of the head will be removed from the actual drive rotating the head about the form angularly.

Figure 1:
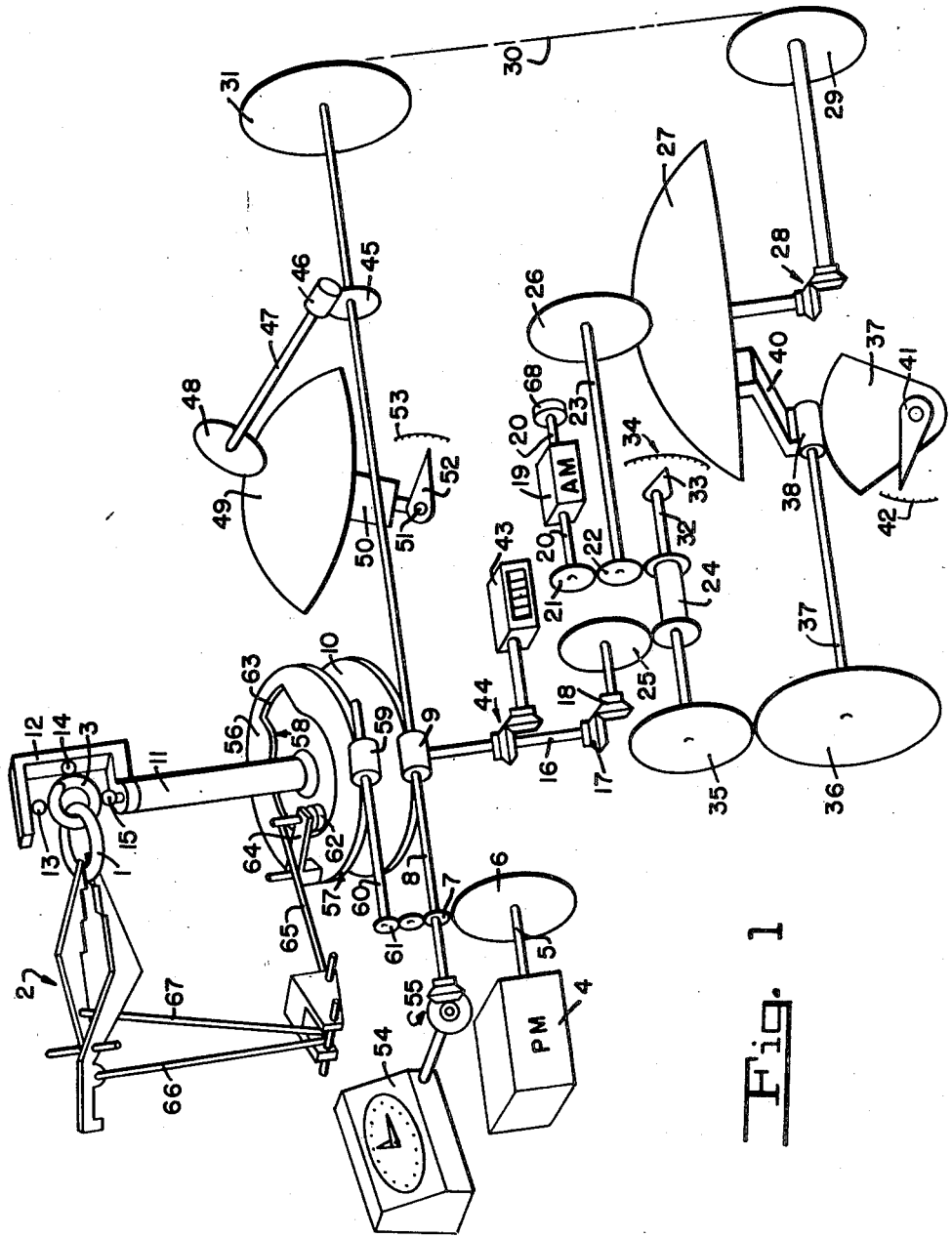
Figure 1 is a schematic illustration of one embodiment of the present invention, comprising a winding machine of the type defined having manual control of the speed cycle of winding.

Referring more specifically to the schematic representation of Fig. 1, there is shown a toroidal form 1, which is to be wound with wire, fixedly held by a plurality of grippers 2, only one of which is actually shown, the rest being omitted for clarity. A shuttle 3 suitably provided with a supply of wire to be wound on the toroidal form, embraces the form. It is the purpose of the present invention to rotate the shuttle 3 both bodily around the form 1 and axially, to wind the wire on the form under precise control of angular spacing.

To this end, a prime mover 4 is provided having a shaft 5 on which is mounted a driving pinion 6. Pinion 6 meshes with a gear 7 mounted on a main shaft 8 which carries a worm gear 9 adapted to rotate a peripheral worm gear 10. Suitably attached to gear 10 is a column 11 having at its upper end a head 12 in which shuttle 3 is removably carried, so that, upon rotation of gear 10, the shuttle 3 will be bodily rotated with column 11 around its vertical axis at an angular speed determined by the various gear ratios and the speed of rotation of prime mover 4. Mounted in head 12 are guide rollers 13 and 14 and driving roller 15, these rollers supporting shuttle 3 for rotation about the transverse axis whereby to wind wire on said form 1.

A preferred way of rotating shuttle 3 from roller 15 is to provide peripheral meshing teeth on the shuttle 3 and on roller 15. Roller 15 is rotated from a shaft 16 which is suitably mounted within a bore through column 11 and which carries a bevel gear 17 at one extremity which is meshed with another bevel gear 18. Gear 18 is driven in part from prime mover 4 and in part from an auxiliary electric motor 19 in a unique way. To this end, auxiliary motor 19 has a double-ended driving shaft 20 which carries a driving pinion 21 meshing with a gear 22 on a shaft 23. Gear 22 also meshes with one side of a differential chain of gears 24 the other side of which meshes with a gear 25 mounted on the same shaft as pinion 18, whereby auxiliary motor 19 will drive gear 18 through gears 20, 21, differential 24, and gear 25. Also, shaft 23 carries at one extremity a friction-faced disc or rider 26 which is adapted to frictionally engage a dome 27 which is rotated from the prime mover 4 through a bevel gear train 28, a gear 29, a suitable geared connection 30 and a gear 31 mounted on shaft 8, which shaft is driven from the prime mover as hereinbefore set forth.

Rider 26 and dome 27 form a speed governor for the rotation of shaft 16 versus the angular speed of column 11, and thus the axial rotation of shuttle 3, and also forms an infinitely variable speed control for this axial rotation of shuttle 3, since the relative position of the rider 26 on the revolving surface of the dome 27 will determine the actual speed of rotation of shaft 16. In order to permit small increments of variation of speed of rotation of the shuttle, means are provided whereby to move dome 27 bodily relative to disc 26. As illustrated, shaft 32 which carries differential 24 has a handle 33 on one end swinging a pointer over a dial 34, for reference, and on the other end, there is mounted a gear 35 driving a gear 36 on a shaft 37. At the other end of shaft 37 is a worm gear 38 driving a toothed sector 39 which sector carries dome 27 by a suitable bracket 40 in such way as to permit rotation of the dome. Thus, by turning handle 33, sector 39 will swing one way or the other carrying the dome with it, and thereby altering the speed ratio of the gear train operating through the dome and rider. The control of the position of dome 27, is operated through differential 24 so as to directly increase or decrease the speed of shaft 16 relative to the speed of shaft 23 in addition to the change of speed obtained by the change of position of dome 27. A derivative value of any change of final relative speed ratio obtained through a change of relative position of dome 27 and rider 26 is thereby directly applied to the shuttle 3 to rotate it axially, by means of the differential 24 during the period of time the handle 33 is actually turned, the final speed of the shuttle axially being a function of this derivative and the direct drive of auxiliary motor 19 through its gears to shaft 16. Also, by utilizing the dome and rider method of control of speed, an extremely small increment of variation can be given to the angular spacing, which again gives a precise control necessary for producing precision electrical components.

In order to clearly indicate the selected amount of movement of sector 39, a pointer 41 is adapted to be moved therewith over a scale 42, which may be graduated in any desired manner, as indicating the angular spacing of the windings of wire on the form.

The arcuate movements of dome 27 under urge of handle 33 will, in actual practice, be permitted by bevel gears 28, by allowing the one gear to change its operating position with respect to the other, or act in a planetary manner, without becoming unmeshed, and this will be clarified hereinafter in the description relating to the actual machine.

In order to be able to know how many turns of wire have been wound on the form 1, a counter 43 is geared by a bevel train 44 to shaft 16, the counter continuously showing the number of turns for the amount of angular displacement, until the form is wound as fully as desired.

In my copending application filed August 23, 1950, under Serial No. 180,923, entitled Variable Speed Control Devices, I have described and claimed a unique, novel and useful means for precisely controlling the speed of a prime mover or other input and this means is hereinafter specifically applied to the present invention for such control purposes as illustrative of one use of said means, without limitation of same to a winding machine as herein described and claimed.

The information and explanation herein given of the variable speed control device of my copending application is only that necessary to show association thereof with the winding machine of the present invention.

To this end, shaft 8 has mounted thereon a worm gear 45 meshing with a worm 46 carried by a shaft 47 which also mounts a rider or disc 48 which is in frictional contact with a dome 49. Dome 49 is rotated by an auxiliary motor 50 which is provided with conventional means for maintaining it at constant speed, and the assembly of dome and motor is adapted to be bodily swung through an arcuate path about a pivot 51 in order to alter the speed ratio of the drive. A pointer 52 is attached to the assembly to indicate the arcuate movements on a scale 53, which may be directly graduated in minutes of time, since any change of relative position of dome 49 and rider 48 will change the speed of the shuttle 3 both in bodily and axial rotation, to increase or decrease the time cycle of winding of a form 1, as explained hereinafter. The assembly of dome 49, rider 48 and worm 46 and worm gear 45 serve the unique function of acting as an escapement to control the power or applied torque of prime mover 4. To further explain this, assuming that worm 46 is so selected that it cannot be turned by worm gear 45, then theoretically, if motor 50 is not rotating dome 49 and current is applied to prime mover 4, the machine will not run since shaft 8 carrying gear 45 cannot rotate, worm 46 preventing this. If now motor 50 is rotated, immediately the shaft 8 will turn and the machine commence to operate but only to the extent permitted by worm 46, namely, only in accordance with the speed conditions and speed ratio of dome 49 and rider 48.

However much torque is supplied by prime mover 4, the speed of main shaft 8 will only be that permitted by the assembly comprising dome and rider 48, 49 and worm and worm gear 46, 45. This will also apply to any variations in line voltage which would normally alter the speed of the prime mover 4, or other conditions which would tend to disturb the speed of main drive shaft 8.

This forms a true escapement mechanism in that the prime mover 4 is applying power to main shaft 8 and gear 45 and if gear 45 were free of worm 46, or able to rotate worm 46, then shaft 8 would attain a maximum rotational speed depending on the speed of rotation of motor 4 and this would vary as the speed of motor 4 varied, under external conditions. Worm 46, however, being the driving element permits power from motor 4 to escape and be usefully employed only to the extent that it is itself rotated by rider 48 and from dome 49. Also, by varying the speed of rotation of the worm by arcuate movements of dome 49 more or less power can be allowed to escape, namely, the speed of winding of the machine can be varied as desired.

In practice, the prime mover 4 provides an amount of torque far in excess of the ultimate possible requirements of the machine, whereby there is always ample torque available for the machine depending on the amount allowed to be delivered by the speed control-escapement assembly.

In order to visually indicate the angular rotation of shuttle 3 around form 1 a geared pick-off from shaft 8 to an indicator 54 is made by bevel gears 55. As shown, indicator 54 may conventionally be provided with two pointers operating over a circular dial, one pointer progressively showing the angular travel made and the other pointer sweeping the dial for each degree of angular movement.

In first setting up the machine for a run, a desirable feature is that the shuttle 3 shall be able to rotate axially about the form 1 without traversing angularly thereabout, so that two or three layers of wire may be overlapped and fastened to the form, for example, with adhesive, to form a fixed starting end of the wire. To this end, shaft 20, which is double-ended, has a knob 68 thereon whereby the driving train to shaft 16 may be turned by hand, a suitable clutch (described hereinafter) operating at that time to disconnect rider 26 from dome 27.

In accordance with another feature of the present invention, means are provided, under action of the prime mover, for progressively removing each pair of grippers 2 from the path of movement of head 12 as it rotates with column 11 around the vertical axis of column 11. To this end, a platform 56 is provided with an external peripheral worm gear 57 and an internally formed cam groove 58. Platform 56 is rotatably mounted on a bearing about column 11 and is driven by a worm 59 mounted on a shaft 60 which carries a gear 61 meshing through an idler with gear 7. The gears are arranged so that platform 56 is rotated by prime mover 4 about column 11 in exact synchronism with platform 10, but by providing the independent drives all possibility of shock due to possible end play in the bearing supports for shaft 60 from the cam groove 58 and the cams operating therein, as hereinafter described, is removed from the sensitive speed control of column 11 and thus head 12 achieved through the control device comprised of the dome-rider assembly 48—49, so that no errors can be introduced in the precise functioning of the machine by the action of the cams and cam groove.

Only one cam 62 is illustrated in Fig. 1 and it will be seen that for a large portion of the cycle of movement of platform 56 the cam groove is concentric therewith and the shaped portion 63 will cause cam follower 64 to move bar 65 to the left in Fig. 1 under urge of suitable pressure, such as spring pressure. Such movement is utilized in any desired way to move lever 67 down and lever 66 up by suitable spring and cam means, hereinafter more clearly described, whereby to open the jaws of grippers 2 and release the form 1 at that point, to permit passage thereby of head 12.

It will follow that the plurality of grippers used will successively and progressively open to let the head past, by means of each cam 62 and associated mechanism and after passage thereby the jaws of the grippers will be progressively closed. In practice, using for example eight grippers 2, at all times five grippers will be fully closed, one will be open, and the other two will be on the threshold of starting the opening or fully closing so that form 1 is at all times firmly and securely gripped and cannot change its angular position once this is established, this being a vital point when winding high precision electrical components.

This arrangement also permits the winding of forms to 360° continuously without having to relocate the relation of the form and head or shuttle, as has been usual in similar machines of the prior art. The winding is continuous for any number of angular degrees of winding desired up to 360 and obviously the winding can continue after the first complete circle has been made to apply a further amount of turns, as desired, as a second layer, and by continuing to run the machine multiple layer components can be wound.

Also, since the machine is capable of running in either direction, it is possible to wind a multiple layer coil or wound form without necessarily going through 360°, since at the desired point the machine as a whole can be reversed in any usual manner. At all times, the form being wound is firmly held until the winding is completely finished and its originally established position will be maintained throughout the winding cycle.

The embodiment of Fig. 1 comprises a high precision winding machine having manual control, namely, by moving dome 27, the angular spacing of the windings can be varied and by moving dome 49 the time-cycle of winding can be selected to suit conditions. Normally, such a machine would only be utilized for winding linear resistors such as rheostats and potentiometers, where the conditions of winding are pre-set and the machine is then allowed to run its cycle. It is possible to compensate for errors while the machine is running, for instance to alter the position of dome 27 to tighten up or loosen the spacing of the windings if the resistance of the wire wound on the form is shown on a suitable instrument, which is herein contemplated. Also, by using counter 43 and angular moving indicator 54, an operator can, at a selected point, alter the position of dome 27 to give a stepped resistance curve, although such a component would be substantially linear in that it is in effect a plurality of linear resistors in series on one form. Thus, therefore, the schematic diagram of Figure 1 illustrates a linear potentiometer or like resistor winding machine, with manual means to vary speeds as desired and with means to select the desired spacing and to correct errors of spacing, if necessary.

The second important embodiment of the invention contemplates a non-linear potentiometer or like winding machine for forming wound cores having a non-linear pattern.

Figure 2:
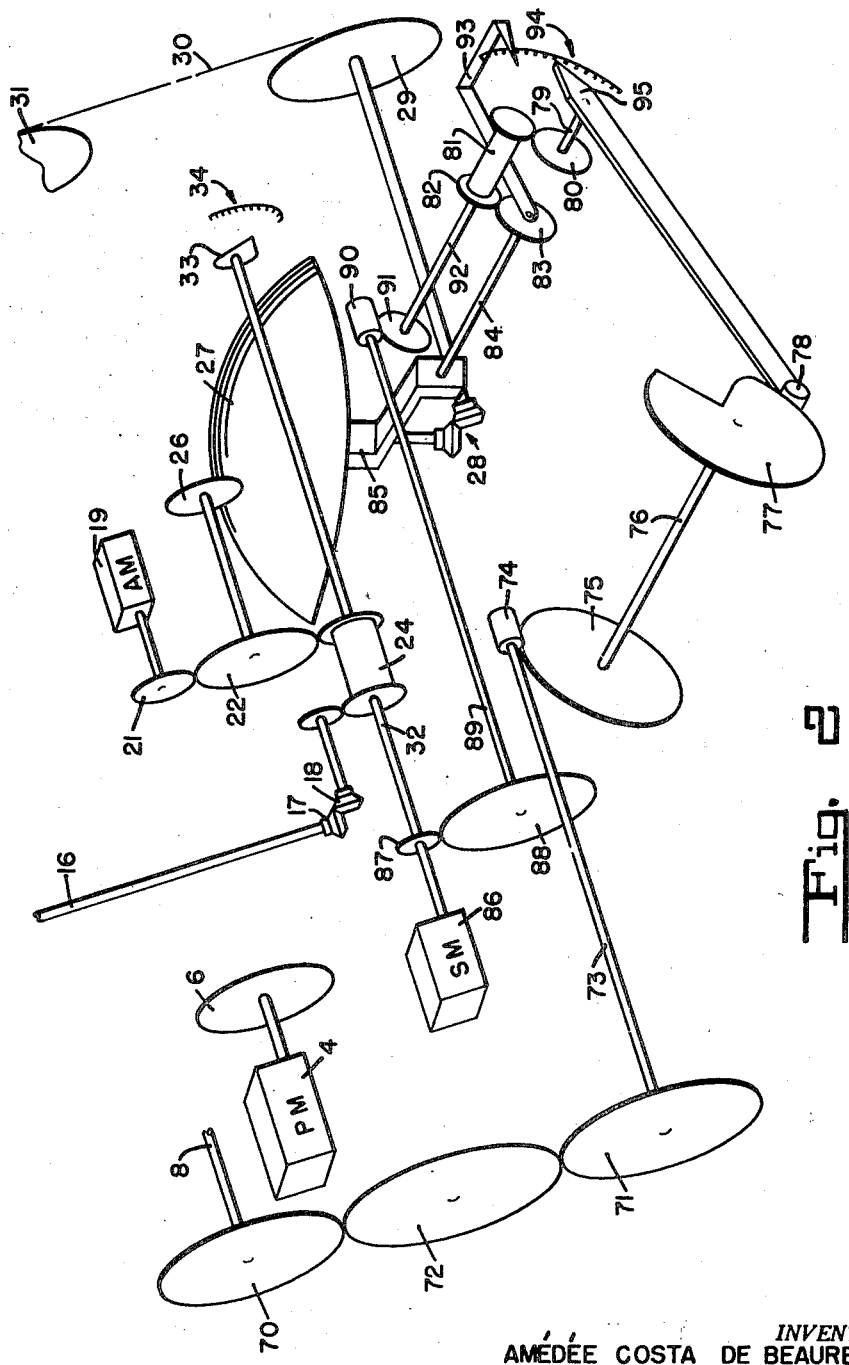
Figure 2 is a schematic illustration of apparatus to be added to Fig. 1 in order to provide a winding machine, as a further embodiment of the invention, which has automatic control of the speed cycle of winding.

In Fig. 2 there is schematically shown the necessary modifications to the apparatus of Fig. 1 in order that non-linear patterns shall be precision wound. In considering a non-linear wound component it is necessary to realize that the windings are to be non-uniformly spaced angularly on the form in a predetermined pattern in order to give the non-linear resistance curve desired.

To this end, cam actuation of the arcuate movements of dome 27 is provided by the present invention, the shape of the cam being so generated as to give to the dome the required advancing and retarding movements so that the speed of rotation of shuttle 3 on its axis will be varied, the speed of rotation thereof bodily being held at a constant ratio thereto, whereby to effect a predetermined spacing of the turns of wire progressively during the winding cycle.

Referring to Fig. 2, wherein like parts have been numbered for associating same with Fig. 1, shaft 8 also carries a gear 70 which drives a gear 71 through an idler 72 in order to rotate a shaft 73 on one end of which it is mounted.

At the other end of shaft 73 is a worm 74 meshing with a worm gear 75 on a shaft 76 carrying at its other end a cam 77. A cam follower 78 is suitably mounted to swing about a pivot 79 under urge of the cam 77 and carries therewith a gear 80 which shares the movements of pivot 79. Gear 80 meshes with one side of a differential chain of gears 81 the other side 82 of which meshes with a gear 83 mounted on a shaft 84 which shaft is fixedly associated with a supporting bracket 85 upon which dome 27 is mounted, so that movements of cam follower 78 cause equivalent movements of dome 27. Thus, the speed of rotation of the shuttle 3 on its axis is varied in accordance with the contour of the cam 77 and a non-linear potentiometer or like wound component can be made by winding wire on form 1 under control of cam 77 without further apparatus.

Such a non-linear component as can be made with the apparatus just described will be as accurate in its resistance curve or non-linear characteristics as a cam can be generated in a specified contour but for very precise components the finished component may not be as accurate as desired due to variabilities in thickness and character of the wire wound on the component. This particularly applies to components wound with very fine wire where small variations may mean relatively large errors.

It is accordingly a further feature of the present invention to provide for correction of such errors when winding a non-linear component, the increments of correction being applied as the error occurs. To this end, shaft 32 extending through and supporting differential gears 24 drivingly communicates with a servomotor 86 and also has a pinion 87 thereon driving a gear 88 mounted on a shaft 89. At the other end of shaft 89 is a worm 90 meshing with a worm gear 91 mounted to rotate shaft 92 which is drivingly connected to the gear 82 of differential 81.

It will be obvious that rotation of the servomotor in either direction will directly affect the position of dome 27 which is being progressively moved by cam 77 so that the effect of cam 77 on the winding speed of shuttle 3 about its axis will be modified by any movement of servomotor 86. A pointer 93 is fixed to gear 83 and moves therewith to indicate on a scale 94 the relative position of dome 27 and another pointer 95 works over the same scale from the cam follower 78. As will be seen, these two pointers work in opposite directions and at the start of a run using the apparatus for automatic correction, the two pointers will preferably be brought into alignment at a common central zero on the scale whereby to indicate by reverse tracking the relative position of dome and cam follower.

If it is so arranged that the servomotor 86 is caused to rotate in magnitude and direction in accordance with the difference between the actual resistance required and the read resistance attained at any point during the angular movement of the shuttle, correction for the error so detected will be made through the medium of worm 90. By reading the resistance of the wire as it is wound on the form in any conventional manner and continuously checking this against the resistance curve to be attained, a precise and accurate wound component can be made. The actual correction will be continuously shown by the lag or lead between the pointers 93 and 95 relative to their common zero, the one showing dome position assumed, and the other cam position, the scale being suitably divided on either side of the zero position to permit this comparison of positions.

Any means may be employed to give to the servomotor 86 the necessary indications of error. The accumulating resistance of the wire as it is fed from shuttle 3 onto form 1 can readily be picked off as a measurable value and can be amplified if necessary and fed to the servomotor.

One conventional manner of performing this function is to attach a master potentiometer or other component of like type to shaft 76 to move therewith. Such a master or control potentiometer will have been wound to exactly the desired characteristics and therefore, if it is placed in one reference leg of a Wheatstone bridge circuit with the potentiometer being wound in the other reference leg of the bridge, a continuous electrical pick-off from both of the two potentiometers will show any out of balance between the master potentiometer and the potentiometer being wound and this out of balance can be applied, after amplification if necessary, to the servomotor 86, to rotate it in magnitude and direction in accordance with the out of balance factor, until correction therefor is accomplished through worm 90.

Alternatively, it is contemplated that cam 77 and follower 78 can be dispensed with and replaced by a master potentiometer working through a Wheatstone bridge circuit, as above described, so as to be the sole means of swinging dome 27 by means of servomotor 86 and worm 90 through its arcuate path the movements thereof following the non-linear characteristics of the master potentiometer, whereby to wind a facsimile thereof on a form 1.

In the schematic representations of Figs. 1 and 2 just described the object has been achieved of precision winding wire upon a form, the final product to be used as a potentiometer or equivalent electrical component, and it is to be realized that up to 360° of winding angularly can be accomplished with this machine. Such a potentiometer may have, as an example, 3000 turns of wire in a 300° area on the circular form with a resistance of 100,000 ohms. It is obvious therefore that a few turns more or less to achieve the desired resistance value will not materially affect the precision of the component, the error being due to variations in the wire, as hereinbefore explained.

In other cases however, the resistance may not be the governing factor and it may be desired to wind a component of the type with which this invention is concerned with an exact number of turns for instance, when winding the field coil of a synchro-unit. In such an event, a direct connection from the prime mover to the shaft 16 is established, for instance by drivingly connecting gear 6 to bevel gear 17, thereby cutting out all control from dome 27 and rider 26, whereby an exact number of turns in a specified angular space will be wound with a selected spacing thereof.

The present invention contemplates a winding machine of novel form employing a plurality of grippers 2 which are periodically opened to allow passage of a head 12 carrying a shuttle 3 embracing the form 1 held by the grippers, the shuttle carrying its own supply of wire and being also axially rotated to place turns of wire spaced upon the form.

The various speed controls and error compensating devices described are not necessary to the successful operation and only serve as ancillary apparatus to make the machine more precise and more versatile.

Figure 3:
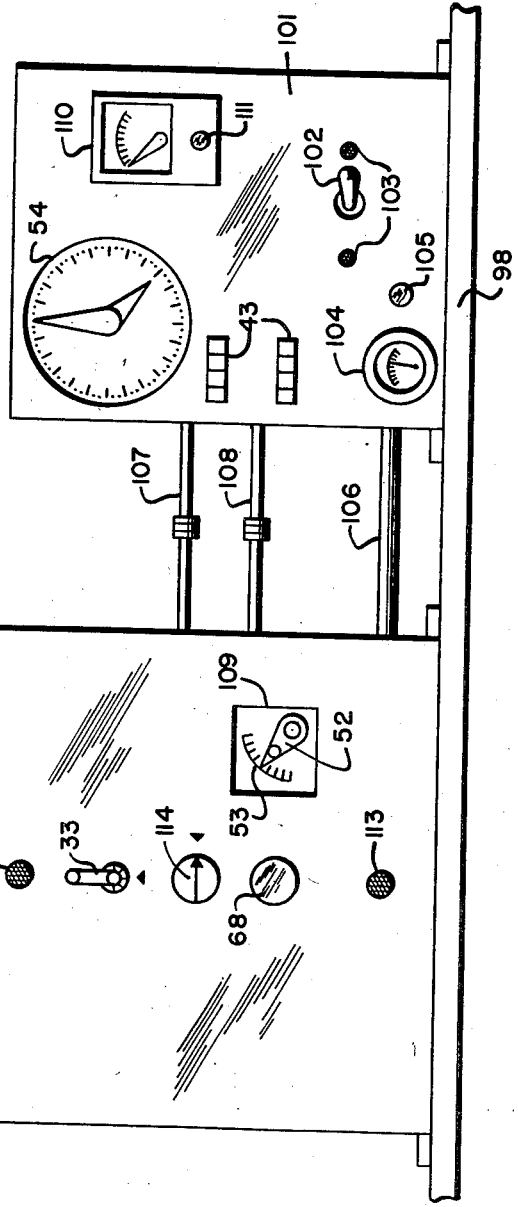
Figure 3 is a front elevation of the machine according to the present invention, as encased in housings and mounted on a platform.

A final unit built in accordance with Fig. 2 and capable of operation in accordance with the description hereinbefore given with respect to either Fig. 1 or Fig. 2 is illustrated in Fig. 3.

A platform 98 supports a casing 99 for enclosing the main operating parts of the machine, a hinged lid 100 being provided which can be raised to permit starting of the winding cycle and for observation. Another casing 101 houses other parts of the apparatus particularly the counters 43 and 54 as shown. A three-way main switch 102 mounted on casing 101 controls the supply of electric current to the whole machine, and can be switched to off position or either forward or reverse, suitable signal lights 103 being mounted on the casing to indicate the existence of current and to show the direction of rotation.

In order to permit an accurate control of the current applied to the various motors of the apparatus a voltmeter 104 is used to indicate voltage applied and a variable resistor controlled by a knob 105 is used to bring this voltage to an accurate desired amount.

The various electric wires connecting the apparatus in casing 101 with the apparatus in casing 99 pass through a conduit 106. The connecting rods 107 and 108 operate counters 54 and 43 respectively. A cut-out or window 109 permits observation of the setting of pointer 52 on scale 53, which scale can, if desired, be graduated in minutes of time of the winding cycle. An ohmmeter 110 is mounted in casing 101 and its connections for reading the resistance of the wire as it is accumulated on the form can also pass through conduit 106. A suitable operating button 111 may be provided to permit either continuous or instantaneous readings. If this button is turned to continuous position, then the resistance of the wire will be continuously shown together with the angular portion wound, as by dial 54, and the number of turns wound, as by counter 43, so that the operator has a complete check at all times that the correct conditions of winding exist.

Mounted on casing 99 are a pilot light 112 which tells the operator that current is switched on, a signal light 113, hereinafter further explained, which warns that the extremes of arcuate movement of dome 27 are being approached, the knob 68 which permits the operator to turn the shuttle 3 on its axis manually, a clutch operating member 114 previously mentioned and hereinafter defined for raising rider 26 from dome 27, to permit manual rotation of shuttle 3 axially, and the handle 33 for moving the dome 27 manually, to effect changes in the spacing of the wire angularly on the form.

In the description hereinafter given with respect to the figures of the drawings illustrating actual operating parts of a machine built on the principles of the schematic lay-out of Figs. 1 and 2 wherever possible or desirable, the parts identified will have numerals applied thereto like the numerals of Figs. 1 and 2, or cross-referenced thereto, with respect to the operating part so that same may be identified in Fig. 1 or 2.

Figure 35:
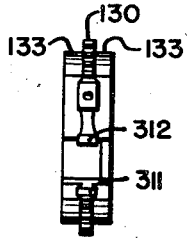
Figure 36:
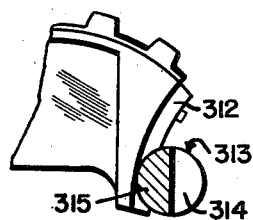
Figure 37:
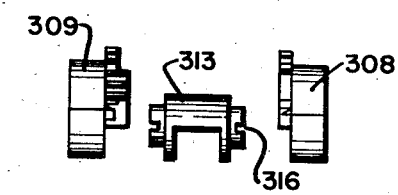
Figure 38:
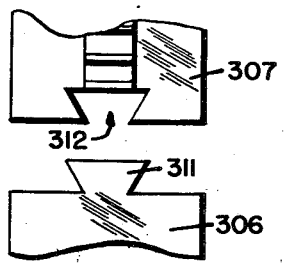
Figure 39:
Figure 40:
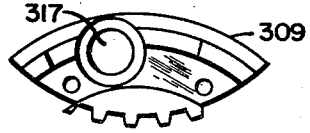

Referring to Figures 5, 6, 7 and 8, the head 12 is mounted on column 11 for rotation relative to fixed surrounding tubular sleeve 118 by means of ball bearings 119 and through column 11 passes drive shaft 16 which is mounted for rotation therewith on ball bearings 120. Mounted on the upper end of shaft 16 to move therewith is a bevel gear 121 meshing with another bevel gear 122 on a shaft 123, the other end of which carries a spur gear 124 meshing with another spur gear 125 on a shaft 126, shafts 123 and 126 being suitably journalled in head 12, as shown. At the other end of shaft 126 a bevel gear 127 is mounted to drive shuttle 3 about its axis. As shown in Fig. 8, gear 127 meshes with another bevel gear 128 mounted on a shaft 129 suitably journalled in part of head 12. A pinion 117 is also mounted on shaft 129 in mesh with an externally projecting peripheral gear 130 on shuttle 3. By this means, rotation of shaft 16 will result in rotation of shuttle 3 about its axis. To guide the shuttle in this rotation, rotatable rollers 131 are provided each having a peripheral groove 132 for giving clearance of the teeth 130, the flanges thus formed engaging the shoulders 133 formed on either side of teeth 130 (Fig. 35). One of the rollers 131 is carried in a nose piece 134 pivotally mounted on head 12, as at 135, whereby it may be swung out of position to permit removal of the shuttle 3 from operating position. As shown in Figs. 9 and 10, nose 134 is spring-urged into closed position by a leaf-spring 136 held at one end by a finger 137 and at the other end in a slot 138 in pivot pin 135.

Referring to Figs. 11, 12, 13, 14, 23 and 24, the means to rotate the head 12 on its vertical axis and carry shuttle 3 angularly around the form 1 are disclosed as comprising a large diameter worm gear 140 (corresponding to platform 10) driven to rotate in a horizontal plane by a worm 141 (corresponding to worm 9), gear 140 being fixedly mounted on the one end of column 11 (Fig. 11), and worm 141 being mounted on a shaft 142 (corresponding to shaft 8, Fig. 1) and being driven by a gear 143 through a gear train 144, from the prime mover 4.

Ball bearings 145 mount the lower end of column 11 in sleeve 118. Sleeve 118 is fixedly held in the main frame 146 by a platform 147, to which it is conventionally attached, whereby rotation of column 11 by gears 140, 141, 143 and 144 result in the head 12 being moved on the vertical axis of column 11, carrying the shuttle 3 angularly around the form 1.

As shown in Figs. 23 and 24, the pick-off for operating counter 54 is also mounted on shaft 142 comprising bevel gears 55.

Meshing also with the gear train 144 is a spur gear 150 mounted on a shaft 151 (equivalent to shaft 60, Fig. 1) which carries a worm 152 meshing with a large diameter worm gear 153, mounted about the exterior of tubular sleeve 118 on a reduced section thereof, by ball bearing 154 and adapted to be rotated in a horizontal plane about the axis of sleeve 118.

A cam plate or platform 155 (corresponding to cam 56, Fig. 1) is integrally attached to worm gear 153 to share horizontal movements therewith and is also carried on sleeve 118 to rotate therearound on ball bearings 156. Cam plate 155 has a shaped cam groove 157, better illustrated in Fig. 12, which is substantially a circle concentric with the axis of sleeve 118 for about 270° of its diameter namely, clockwise from point A to point B, and the remaining 90° is shaped at each end first with a gentle dip and then with a positive decline at C.

Figure 12:
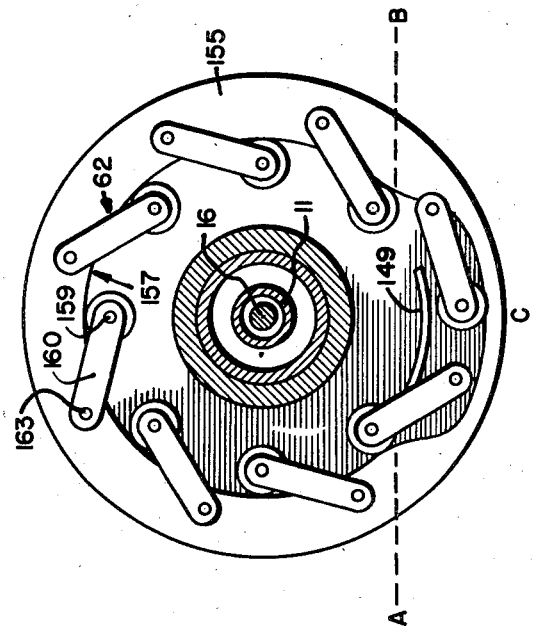
Figure 12 is a plan view of the operating cam of the machine of Fig. 11, showing the cam followers in operating positions, parts being omitted for clarity.
Figure 22:
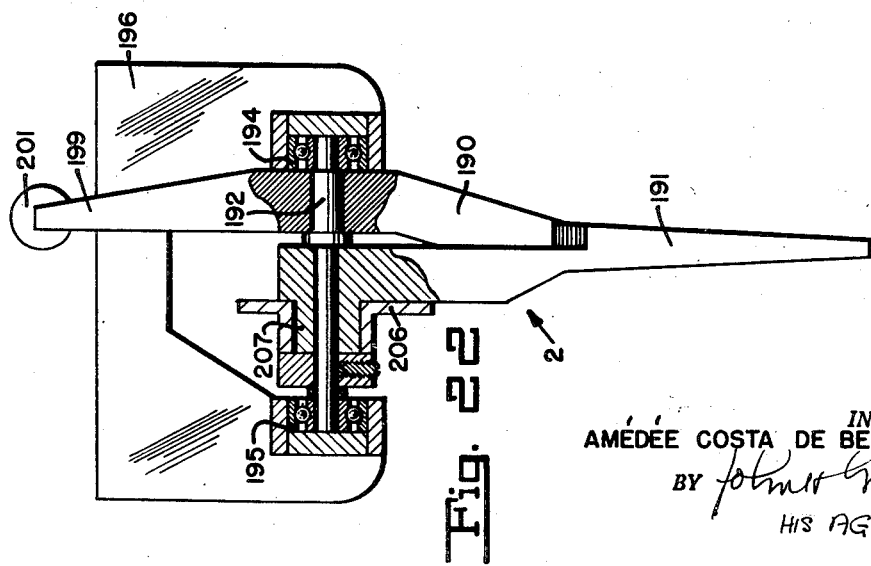
Figure 22 (sheet 6) is an enlarged plan view of one of the grippers shown in Fig. 21.
Figure 13:
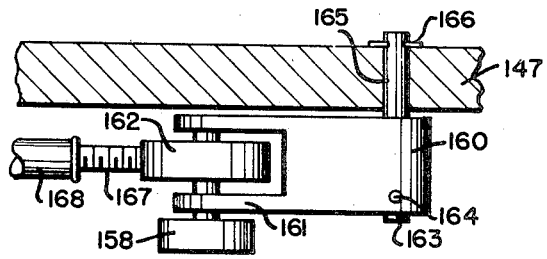
Figure 13 (sheet 16) is an enlarged detail of the cam followers of Figs. 11 and 12.

Fig. 12 is somewhat diagrammatic in that for reasons of clarity certain parts of the mechanism for operating grippers 2 have of necessity been omitted, but it clearly shows the relative position of each cam follower 62, (see Figs. 1 and 12) around cam groove 157 where eight grippers 2 are employed, their being, of necessity, a cam follower for each grippers 2.

A portion 149 forming an inside cam track to capture each cam follower 62 at C is provided to prevent the cam followers from riding off, since at this area the fingers of grippers 2 are open, as will be hereinafter explained.

From Fig. 12, it will follow that if means are provided for associating each cam follower 62 with its grippers 2 so that when on the concentric part of the cam between A and B clockwise, as aforesaid, the fingers forming grippers 2 are closed upon the form, and when in the portion at C between A and B, the fingers of the grippers are open to allow passage of head 12, then the form being wound will be held in pre-set position at all times during winding and angular movement of the shuttle 3 around the vertical axis of column 11 will be permitted, the grippers 2 being progressively opened to allow head 12 to pass by and then closed.

To this end, as shown in Figs. 11, 12, 13 and 14, each cam follower 62 has a roller 158 (Fig. 13) which may conveniently be a steel encased ball bearing, mounted to rotate on a pin 159 carried by a lever 160 having a forked end 161 embracing a reciprocating end bearing 162 also mounted on pin 159.

Figure 14:
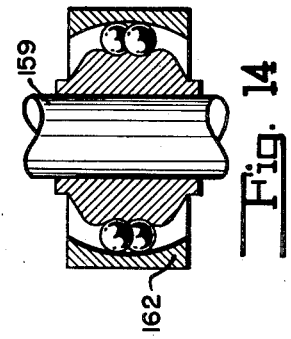
Figure 14 (sheet 6) is an enlarged detailed section of an end reciprocating bearing shown in Fig. 11.

Fig. 14 illustrates such reciprocating ball bearing 162 although same are conventional, permitting angular deflections of the bearing relative to its shaft without disturbing the anti-friction properties of the assembly due to the shape of the inner race and the dual balls. This deflection or tilting is shown in Fig. 11, the left hand roller 158 being on the concentric part of the cam groove with grippers 2 in fully closed position and bearing 162 tilted downwardly to its extreme position on the left side, and the right hand roller 158 being in the decline of the cam groove at C with grippers 2 fully open and the bearing 162 tilted to its extreme raised position on the right side.

It will be noted that in Fig. 12 the bearings 162 have been removed in order to clearly show the cam followers 62 and their position relative to the cam groove. Each lever 160 is mounted for reciprocation upon a pivot pin 163 held in a bore in the lever by a taper pin 164 and mounted in a bearing 165 in platform 147, the pivot pin being held in position by a spring lock washer 166.

Thus each lever 160 can pivot on its pin 163 to permit its cam follower to follow the contour of the cam groove 157.

Each of said reciprocating end bearings 162 has a threaded pin 167 which is secured to a connecting rod 168 suitably interiorly threaded to receive same. Connecting rods 168 are each operatively associated with linkage to operate the opening of the fingers of grippers 2, in accordance with the movements of cam plate 155 against pressure supplied through the operating arms generally shown at 169 which arms connect with and operate the separate fingers of each grippers 2, as hereinafter set forth.

Each arm 169 is constructed similarly being formed with an upper hollow tubular section 170 closed at the upper end and bored as at 171 to be pivotally connected to a finger of grippers 2, and a lower section 172 having a protruding rod 173 adapted to slidingly enter bore 174 of the section 170. Rod 173 has a screw threaded section which threads into the interior of a collar 175 which in turn is threaded onto a stem 176 which forms part of the body of lower section 172 (Fig. 16). Stem 176 is threadedly connected with connectors 177 (Fig. 15) on a pivot pin 179, the two arms 169 shown commonly so mounted being capable of operating the two fingers of one set of grippers 2. Pin 179 is carried in a forked lever 180 which has a depending L portion 181 also having a forked end through which a pivot pin 182 passes mounting a bearing 183 which is attached to connecting rod 168. Bearing 183 will also be preferably a reciprocating end bearing of the type shown in Fig. 14, to take up any side thrusts in the other plane. In other words, connecting rods 168 each terminate at both ends in a reciprocating end bearing, the two bearings being in planes normal to each other. Lever 180 is pivotally attached by a pin 184 to an arm 185 also having a forked end, arm 185 being mounted on platform 147 in any desired way to be fixed thereto. Thus, as the cam followers 62 change their position bodily under control of the cam groove, arms 169 will be raised or lowered, as the case may be, from the extreme low position of Fig. 16, when the fingers are to be closed on the form, to the extreme high position of Fig. 17 when the fingers are to be completely released and cleared wide for the passage of the head thereby.

As previously stated, rod 173 slides in the hollow bore 174 of upper section 170. In order to apply a resilient force to the system just described, an expansion spring 186 is housed within an enlarged portion 187 of section 170 abutting against a cover 188 bored to allow passage of rod 173 and a collar 189 fast on rod 173. Spring 186 serves the dual purpose of spring loading the system to tend to keep cam followers or rollers 158 in contact with the cam groove 157 at all points except at area C (Fig. 12) when inside cam tract 149 operates if necessary to keep the cam followers in contact, and also to apply a spring loading to the fingers of the grippers 2 when in contact with a form 1.

As will be seen by a comparison between Figs. 16 and 17, in the fully open position of Fig. 17, spring 186 is expanded and exerts no effort, whereas in the fully closed position the spring is fully compressed and a space D exists between collar 175 and cover 188.

As hereinafter brought out, the fingers of grippers 2 attached to bores 171 are lightly balanced, so that, if the transition from the position of Fig. 17 to that of Fig. 16 be considered under urge of a cam groove shaped like that illustrated in Fig. 12, first the whole arm 169 will begin to descend and the gap D will remain closed since there will be no resistance to this downward pull, but when fingers have closed on the solid body of the form 1, if further downward movement is applied to the arm 169 only the lower section 172 can move, and gap D will be created applying an equalizing spring pressure to the fingers in contact with the form.

In order to adjust this spring pressure for the various arms 169, and to compensate for the different angular positions necessarily assumed for each pair of arms operating on each of grippers 2 (see Fig. 11) the collar 175 has been provided. This adjusts the relative position of the upper section 170 and the lower section 172, and controls the spring pressure therebetween. The spring pressure for all of the lower fingers 190 will be equally adjusted by this means, as will the spring pressure of the upper fingers 191, but the spring pressure of the lower fingers 190 will be greater than that of upper fingers 191, as hereinafter explained.

Details of the construction and operation of the fingers forming grippers 2 are illustrated in Figs. 18 to 22 inclusive taken in conjunction with the side view of Fig. 11.

Each of the grippers 2 comprises a pair of fingers 190 and 191 (Figs. 11 and 22) which are hinged to move relative to each other on pivot pins 192 and 193 mounted in ball bearings 194 and 195 carried in a mounting block 196 fixed to the main frame 146 on a top plate 197 in a conventional manner. Each of the fingers is provided with an insert 198 of stepped conformation, whereby different sizes and diameters of forms can be accommodated while still utilizing the same shuttle, these inserts being of insulating material, if desired. Lower finger 190 has a rearward extension beyond its pivot 192 comprising an arm 199 having a depending portion 200 at its extremity adapted to abut against a stop 201 in plate 197, stop 201 being adjustable as to height by a nut 202 against a spring 203, so that each lower finger 190 may be located in exactly the same horizontal plane and this horizontal plane can be raised or lowered to accommodate different sizes of forms. Depending below arm 199 and formed integrally therewith is a lug 204 which is adapted to be attached to an operating arm 169 by a pin 205 through bore 171. Thus, when arm 169 moves from the position of Fig. 17 to the position of Fig. 16, the lower finger 190 will be pivotally swung from fully open to fully closed position (Fig. 11). Lower finger 190 has therefore a positive direct action, which is desirable particularly since when preparing the machine for a run it is advantageous to have a number of the lower fingers in the position shown on the left of Fig. 11, so that the form 1 can be first laid thereon and aligned. This necessitates means for locking and releasing the upper finger 191 from its position on the left of Fig. 11.

To this end, and as particularly shown in Figs. 18 to 21, finger 191 is not directly and positively driven from its operating arm 169 but is pivoted about its pivot pin 193 through the medium of a lockable and releasable latch 206 which is mounted to pivot about a circular hub 207 formed integrally with finger 191 and concentric with and surrounding pivot pin 193, whereby latch 206 can move relative to, and independently of, finger 191. Latch 206 has an arcuate slot 208 therein, the curvature thereof being concentric with the hub 207. A tongue 209 mounted on a trigger 210, which trigger is pivotally mounted as at 211 on finger 191, is arranged in one position (Fig. 20) to enter said slot and permit said finger to pivot open and relative to the latch and in another position to abut against a face of said latch, to lock said finger in downward position (Fig. 19). Trigger 210 is spring pressed into the raised or locking position of Fig. 19 by a shaped ribbon spring 212 which projects into its path of movement at one end 213 and at the other is fixed in any desired way to finger 191. Since latch 206 is directly connected to operating arm 169 as by pin 214, when in the locked position of Fig. 19, the arm 169 can operate the finger 191 to raise and lower same under movements of cam followers 62 and at all times the latch 206 will remain locked with finger 191 and will move associated therewith until the trigger 210 is depressed against its spring 212 into the position shown dotted in Fig. 19, where the tongue 209 can ride in slot 208 to permit the finger 191 to be raised. This is particularly necessary when starting the machine for a run, as will be hereinafter explained when describing the operation of the machine.

In practice, the spring 186 for each lower finger 190 is adjusted to have greater spring pressure thereon than its upper finger 191, as much as twice the pressure being utilized in some cases.

This results in each arm 169 attached to a finger 190 will have greater spring tension than the arm 169 attached to the cooperating finger 191 in order to load the abutment 200 which is formed on the extension 199 of finger 191, against the adjustable stop 201. This will preserve the precise height level of form 1, as established by the adjustment made for stops 210, and will present a solid platform at the ends of lower fingers 190 upon which the form can be initially set up and subsequently held by the cooperating fingers while winding is in progress.

Referring to Figs. 23 to 31 inclusive, details of the operating mechanism for driving the domes 27 and 49 and cam 77 are illustrated together with the refinements for such operating parts. Fig. 33 shows a front view of the gearing utilized to rotate dome 27 from the prime mover, this gearing being at the front of the machine, or on the right of Fig. 23. Shaft 142, which is the main drive shaft of the machine and is driven from prime mover 4, extends through the sideplate 146 of the machine and carries a pinion 217 which meshes with a spur gear 218 mounted on a shaft 219 also journalled in sideplate 146. On shaft 219 is also a spur gear 220 meshing with a gear 221 on a shaft 222 which carries a gear thereon 223. Gear 223 drives a gear 224 on a shaft 225, the other end of which carries a bevel gear 226 meshing with a bevel gear 227. Gear 227 is fixed on one end of a shaft which carries at its other end a bevel gear 228 meshing with a bevel gear 229 which directly rotates the shaft which carries the dome, gears 228 and 229 constituting the gears 28 of Fig. 1. Gears 218, 220 and 221, 223 are carried on a hanger 230 having a slot 231 in which the shafts of said gears can slide whereby the gear ratio of the drive may be changed by replacing the gears with others, the hanger 230 pivoting around shaft 219 and being held in position with the gears in mesh by a set screw 232 operating in a slot 233. Thus, the basic rotational speed of dome 27 can be selected and the speed of axial rotation of shuttle 3 can be predetermined to suit desired winding conditions. In order that dome 27 may be swung through an arcuate path to vary the speed ratio of dome 27 and rider 26, a sector 234 is provided (similar to sector 39 of Fig. 1) having some teeth thereon 235 meshing with a worm 236 which is carried on a shaft 237 having a spur gear 238 at its other end. Gear 238 meshes through a gear train 239 with a gear 240 mounted on a shaft 241 which carries a gear train 242 adapted to be rotated by turning handle 33. By rotating handle 33 the position of dome 27 can be manually changed to select a speed of winding axially of the shuttle, when the rider 26 is caused to rotate by motor 19 of Fig. 1.

Where the modified form of machine schematically illustrated in Fig. 2 is utilized, means are provided, according to a further feature of the invention, to cause dome 27 to follow a predetermined pattern of arcuate movements under control of a gear driven from the prime mover and driving a cam which has a follower adapted to cause such arcuate movements of the dome.

To this end, as best shown in Figs. 24 and 25, main shaft 142 extends beyond sidewall 245 of the frame of the machine and is suitably journalled therein. A spur gear 246 is mounted on shaft 142 and meshes with an idler gear 247 which in turn meshes with a gear 248 external of sidewall 245 and mounted on a shaft 249 which carries a worm 250 meshing with a large worm gear 251 mounted on a shaft 252. Gears 247 and 248 are carried in a hanger 253 pivotally swingable about shaft 249, so that a different size of idler gear 247 may be used, if desired, to change the gear ratio. The feature of interchanging of the speed ratio of this gear train has the advantage that with a given design or contour of cam, wound components of different angular lengths can be produced having the same non-linear characteristics.

For example, a specific cam can wind a potentiometer having a resultant non-linear resistance curve which may have either 270° or 330° of angular length occupied by the windings. The speed of driving the cam will obviously determine the angular space occupied on the form by the wires but the resistance curve will be as determined by the contour of the cam.

Hanger 253 has an arcuate slot 254 at its end which engages a lock bolt 255 in sidewall 245, whereby the gear train can be locked in mesh, this gear train corresponding to train 70, 71 and 72 of Fig. 2. Alternatively, when the machine is being used for manual control of dome 27, as in Fig. 1, hanger 253 serves the purpose at that time of being swung aside to disconnect gear 246 from gear 248 and thus silence the automatic control caused by worm gear 251, as hereinafter brought out. It is for these purposes that the gear train and hanger 253 is external of the main framework of the machine, to permit ready access thereto.

Thus, since shaft 142 is the main drive shaft, receiving its rotation from prime mover 4, worm gear 251 will be rotated from the main drive at a speed determined by the selected gears of the train, when automatic control is desired, and when manual control is desired, worm gear 251 can be silenced, by swinging hanger 253 to disconnect gears 247 and 246. As shown in Fig. 27, shaft 252 extends through a bearing block 257 to the external side of side plate 146 to support a suitably shaped cam 77 (see Fig. 2 and Figs. 24 and 27) so that the cam will be rotated on the axis of shaft 252 by worm 251. A cam follower 258 (similar to follower 78 of Fig. 2) is mounted on a shaft 259 also suitably journalled in sideplate 146, the follower having an integral pointer 260 (Fig. 24) which operates over a scale 261 to indicate progressively the winding position of cam 77.

Referring to Figs. 27 and 30, the toothed sector 234 is arranged to rotate freely and coaxially around the hollow shaft 271 and is coupled for such movements to a plate 263 of similar shape to the sector but having no teeth thereon. Sector 234 and plate 263 support a shaft 264 (Fig. 30) and a shaft 269 (Fig. 27) on which two pairs of pinions 268 and 267 are mounted respectively, the pinions 268 being intermeshed with each other, as are the pinions 268. Pinions 268 mesh also with spur gear 270 and pinions 267 mesh also with 265. One pinion of each pair is also intermeshed, so that cam follower 258 can move dome 27 in an arcuate path through the medium of shaft 259, gears 265, 267, 268 and 270, the dome supporting bracket 272 being fixed to hollow shaft 271 driven by bear 270.

The worm 236 can also effect the position of the dome 27, by directly moving sector 234 with the teeth of which it is in mesh, the plate 263 sharing such movements, and the gears 265, 267, 268 and 270 forming therewith a differential train permitting such movements, the cam follower 258 being spring urged into contact with cam 77 by a suitably placed strong spring (not shown) in order to restrain the cam follower from sharing any of said movement. Thus, any rotation of worm 236 will cause equivalent movement of sector 234 and displacement of dome 27, in one or the other direction, and of a magnitude determined by the rotational movement of worm 236. This enables manual or automatic control to be effected through worm 236, to introduce corrections which may become necessary to correct detected errors, by changing the relative position existing at any time between the cam follower 258 and the dome 27, even while the machine is running.

In order to give exact indications of the position occupied by the dome, and to permit of comparison between dome position assumed and cam follower position assumed, a pointer 274 is attached by a bracket 275 to gear 270. In the sidewall 276 there is arranged a transparent window 277 (Fig. 24) so that pointer 274 may be externally viewed and scale 261 may conveniently be etched on window 277 for comparison of positions of pointers 260 and 274 relative to a common zero.

It is obvious that sector 234 will have extreme positions which must not be exceeded in order to prevent worm 236 and worm teeth 235 from disconnecting at the limits of the throw, and in order to avoid such error, a signal light 113 (Fig. 3) is adapted to be illuminated just before the two extremes of movement are reached. To this end, limit switches 278 and 279 are actuated by a switching block 280 mounted on sector 234 to illuminate light 113 in a conventional manner.

As previously set forth in the description of Fig. 2, it is a further feature of the present invention to provide for means for adding an increment of movement to dome 27 to change the speed ratio of dome and rider in accordance with the requirements indicated in order to wind a precision component.

To this end a servomotor 86 (Figs. 2, 26 and 27) is provided adapted to receive a signal of magnitude and direction such as to rectify a detected error and apply correction to dome 27, this servomotor being attached to sidewall 245 in any desired manner and being mounted on an extension of shaft 241, which is adapted also to be rotated manually by handle 33. Thus, any such signal may be transmitted through gears 238 and 239 to worm 236, to alter the position of the dome. The manner of providing such a signal can vary and, as pointed out hereinbefore, one form may comprise mounting a master wound component such as a potentiometer to move with cam 77, namely upon an extension of shaft 258, and reading the resistance thereof as the cam progresses through its path. The potentiometer or like component being formed on a form 1 would then have its accumulating resistance read on the ohmmeter 111 of Fig. 3 by pickup means shown in Figs. 31 and 32, comprising a spring finger 282 shaped to bear against the wire being wound on the form, at least the contact portion of which will be bared of insulation by usual means. Since grippers 2 have insulating inserts, it now is only necessary to ground the machine in order to read the resistance of the wire as it is wound on the form.

To establish good ground contact of the moving head with the fixed sleeve 118 there is provided a metal contact ring on sleeve 118 and a spring pressed contact 284 on head 12.

The read resistance of the wire being wound on form 1 can now be tracked with the resistance of the master potentiometer, and any out of balance, for instance detected by a conventional Wheatstone bridge circuit, can be applied to the servomotor 86.

In order to rotate rider 26 and to apply a part of the rotational force to the shaft 16, an auxiliary motor 19 is provided suitably mounted on a platform 285 fixed to sidewall 245. Motor 19 has an operating shaft 286 which passes through the front wall 287 of the machine frame and carries the knob 68, for manual turning of shaft 16, by means of a pinion 288 on shaft 286 which meshes with a spur gear 289 on a shaft 290. Shaft 290 carries at one end a yoke 291 in which is rotatively mounted the friction wheel or rider 26 for dome 27. At its other end it carries an idler gear 293 which meshes with one side of a differential chain of gears 294 the other side of which comprises a gear 295 meshing through an idler with a spur gear 296 drivingly carrying a bevel gear 297 meshing with a bevel gear 298 on the end of vertical shaft 16, gears 296 and 297 being mounted on a shaft 299 which is extended to support bevel gears 44 which operate counter 43 (Fig. 1).

Thus, by rotation of shaft 286 by turning knob 68, shaft 16 will be rotated through differential 294, to allow for manual rotation axially of the shuttle 3, and in the same way auxiliary motor 19 will drive the shaft 16 at a speed determined by the ratio between dome 27 and rider 26. It will also be seen that rotation of handle 33 will change the position of the dome, and thus the speed ratio between dome and rider, by working through gear 240, without increasing or decreasing shuttle speed through the differential 294.

In order to relieve the knob 68 and shaft 286 from the friction of the rider and dome and permit manual turning thereof, a clutch 114 (see also Fig. 3) is provided which acts through a shaft 281 to turn member 300 to a position to raise yoke 291 by its flange 301 and relieve the contact of rider and dome, the small amount of lift or movement necessary being permitted by a universal joint 292.

Figure 26:
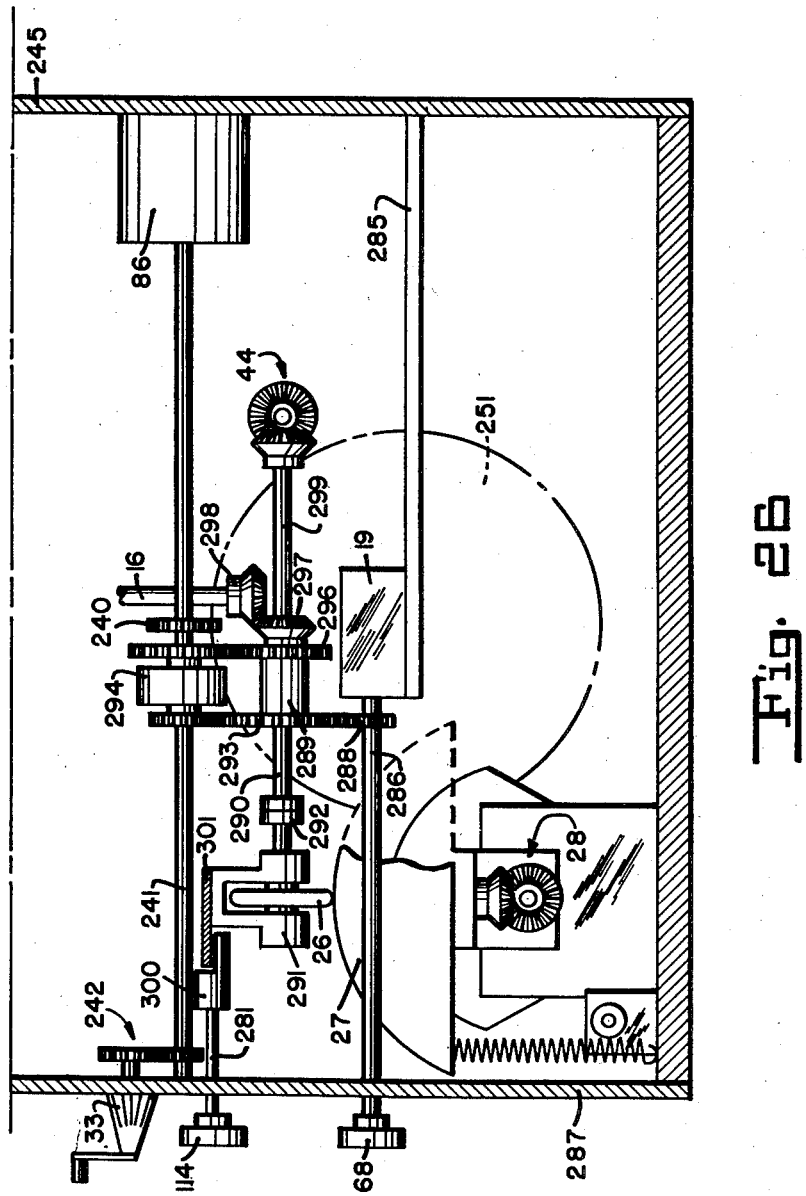
Figure 26 is a side view of the machine on the opposite side to the view of Fig. 24, shown with some of the parts omitted or cut-away for clarity.

As shown in Figs. 26 and 27, dome 27 is spring urged by a spring 302 against movements from its upright position as shown, to tilted positions, clockwise in Fig. 26 to alter the speed ratio of rider and dome. Flange 301 of yoke 291 extends to sidewall 303 where it is hinged to a block 304 and spring urged by spring 305 to cause an estimated amount of frictional contact between rider 26 and dome 27.

In Figs. 34 to 40 inclusive the construction of shuttle 3, for use with the present invention is shown. Shuttle 3 comprises a body 306 having the peripheral teeth 130 by which it is rotated formed in a central section with the shoulders 133 on either side, as previously described. Body 306 is C shaped, generated on a circle, and the missing portion to complete the circle is provided by a section 307 formed of two halves 308 and 309 (Figs. 39 and 40) which mate together when fastened by screws 310 to continue the toothed section and shoulders of body 306. A keystone track 311 (Fig. 38) in body 306 engages a mating groove 312 in section 307 to permit the section to slide away in the position of Fig. 34, whereby the shuttle may embrace a form, after which the section is slid by the track and groove into the position shown in Fig. 6. In order to lock the shuttle in this closed position a shaped pin 313 having a part cut-away 314 engages a cut-out 315 in keystone track 311, and is turnable from either side of the shuttle by screw slots 316, so that either the solid portion of member 313 is in its slot or cut-out 315 to lock the shuttle or the hollow portion registers with the cut-out when the section 307 can be slid to open position. To obtain the necessary frictional bind, the member 313 is placed eccentric to the center of the cut-out 315 by arranging the bores 317 in which the screw slotted parts of the member 313 lie when in assembled position, to obtain a small eccentricity. The shuttle carries a removable wire spool 318 which is initially filled with a supply of wire. A tensioning device 319 applies the necessary drag on the wire and a jewelled bearing 320 guides the wire from the spool onto the form. Since the details of the shuttle form no appreciable part of the invention, further details, other than those given for understanding its operation will not be given. The path taken by the wire from spool 318 through tensioning device 319 and jewelled bearing or guide 320 to form 1 is shown in Fig. 6.

While the speed change device of dome and rider gives the best results where infinitely variable speed changes are required, any other form of variable speed device can be substituted without altering the precise control values of the system. It should be noted that the spherical variable speed precise control escapement-assembly just described owes its precision in part to the fact that the torque load is not transmitted through the drive itself.

In Figs. 41 and 42 there are shown some refinements for operation of the winding machine according to the present invention. Fig. 41 is a similar plan view to that of Fig. 21 showing a form 1 held by the grippers 2, but in the figure, the machine has not yet been started to commence winding, and the form is being aligned in position to be exactly concentric with the axis of rotation of head 12, as is necessary for precise winding. To align the form, a plurality of rods 337 are provided four being specifically utilized in Fig. 41 at 90° apart. Each rod is inserted in a horizontal plane through a supporting block 338 which carries a cut-out switch 339 in such position that when a rod is inserted in the orifice 340 in the block a spring pressed operating lever 341 will be raised to open the main circuit to the machine. The switches 339 are connected in series with each other so that before the machine can run, all four of the rods must be out of the orifices 340. Blocks 338 are mounted on top plate 197 by screws 343. Each rod 337 has a collar 344 placed thereon at such a position that when the rod is fully engaged in its orifice 340, and the collar abuts against the flat face of its block 338, the tip of the rod will be exactly touching the external face of the toroid or like shaped form, if the form is properly aligned concentrically with the axis of rotation of the head 12. Thus, the four rods 337 can align the form, as desired. Collars 344 may be adjusted along the length of their rods for different diameters of forms; or separate rods with fixed collars may be used for each diameter of form used.

It is a further desirable feature of the invention to provide means for lining up a form in the exact angular position occupied by a previous form, already wound, to obtain an exact duplication. This would apply for example when ganged potentiometers were being produced.

Figure 4:
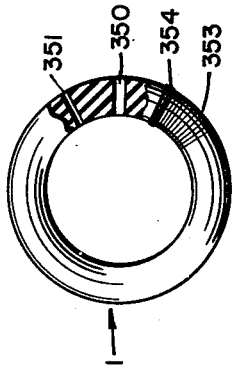
Figure 4 is an enlarged plan view, partly in section, of a typical form or core used by the machine of the present invention for having wound thereon wire or like filamentary material.

To this end, referring to Figs. 4 and 41, a small telescope 345 is provided mounted to move horizontally on its track 346 by handscrew 347. Telescope 345 is of conventional design in which examination through an eye piece 348 shows an enlarged picture of an object in the horizontal axis of the main lens 349. The form 1 has a transverse hole 350 therethrough which may be the mounting screw hole in a potentiometer and by placing this hole in line with the reticules of the telescope 345, exact placement of each form can be had. When, as often occurs, the starting of the winding is desired at or very near the hole 350, the head 12 would normally obstruct the view. To provide for this, head 12 is bored as at 352 (Figs. 5 and 6) to permit exact placement of a form with the head in position to start the winding at hole 350.

The form shown in Fig. 4 also has a hole 351 slightly spaced from mounting hole 350 and in a potentiometer, another hole similar to 351 would be equally spaced on the other side of hole 350, this being hidden by the wires 353 already wound on the form. These holes 351 serve for terminal connections and they also may be used, if desired, for lining up a form with telescope 345, to obtain a uniform result. The overlaid wires shown at 354 are the turns placed on by hand by using knob 68 and adhesively bonded temporarily to cause a starting end as previously described.

The wiring diagram shown in Fig. 43 utilizes the reference numerals previously employed in Figs. 1, 2 and 3. A source of direct current supply is fed to the switch 102, which has an off position together with forward and reverse. Motors 4, 19 and 86 are connected in parallel under control of said switch, since each must function in the same direction and preferably from the same source of supply. A rheostat 105 can vary the input to the motors and the amount of voltage thus supplied is read on voltmeter 104. Pilot light 112 shows when the current is available and pilot lights 103 indicate the forward or reverse conditions of switch 102. Limit switches 278 and 279 operate to light warning light 113 if the limits of movement of sector 234 and its dome 27 is being reached. Series connected cut-out switches 339 act to prevent the machine from being started if one or more of the guide rods 337 are still in position in orifices 340, thus preventing damage to the machine caused by the head 12 coming in contact with a rod 337 which all lie in the path of movement of the head.

Operation of the machine

Figure 34:
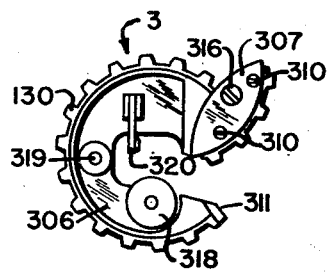

When using the machine for winding a non-linear component such as a potentiometer on a toroidal form such as shown in Fig. 4, the shuttle 3 is removed from the machine and is loaded with the size of wire to be used. The machine will be so arranged that one grippers 2 will be in open position and the rest of the grippers closed, and for aligning purposes the hole 352 in head 12 is in line with the telescope 345 (Fig. 41). Triggers 210 (Figs. 18, 19, and 20) will be depressed to release the latches on all the upper fingers of the grippers which are closed, the spring-loaded lower fingers now forming a seven-pointed base onto which may be laid a form 1 of desired size. Rods 337 of the correct size for this form are now inserted in the blocks 338 to center the form on the center line of column 11. The upper fingers are now depressed into latched position (Fig. 19) and the form is ready for winding. Nose 134 of head 12 is now lifted to clearance position and shuttle 3 in the open position of Fig. 34 is now inserted in head 12 embracing the form and in contact with its operating gear 117. Nose 134 is now allowed to resume its normal position (Fig. 6). The wire on spool 318 is passed around tension device 319 and is then threaded through jewel bearing 320. From there it is wrapped around the form in a few binding turns by manual rotation of the machine by knob 68, clutch 114 being thrown to release position to permit turning by removing rider 26 from dome 27. The turns now on the form, shown in Fig. 4 at 354, are adhesively bonded to the form to act as a starting end. Clutch 114 is now thrown to its other position, rods 337 are removed and the machine is now ready for automatic winding. The position of dome 27 will be selected to suit winding conditions for the results to be obtained, namely the angular spacing desired, by moving handle 33 (Fig. 26) to indicated position, and handle 52 (Figs. 3 and 44) will be moved to a position indicated on scale 53 to give a winding cycle appropriate to the type of winding and characteristics of the wire being wound.

Switch 102 is now thrown to "forward" position and the winding cycle will commence, the grippers 2 opening progressively to permit passage of head 12 thereby under cam action of the cam groove 157 and cam followers 158 (Fig. 12). During the winding, if desired, the resistance of the wire upon the form can be observed on ohmmeter 110 and compared with the angular space occupied and/or the number of turns on the counters and indicator (54 and 43, Fig. 3). If a correction is needed, this can readily be applied, without stopping the machine, by turning handle 33 to cause as small an increment of movement of dome 27 relative to rider 26 as is desired to effect the correction.

Upon completion of the angular winding to the number of degrees desired, the machine is stopped, the end of the wire is severed from the supply spool and the last few turns adhesively bonded in place. The wound form is now removed from the machine by unlatching the grippers, and opening the shuttle, and can thereafter be utilized as a potentiometer, after assembly with usual contacts, terminals, etc.

Where a non-linear winding is to be wound, a suitably shaped cam, namely cam 77 (Figs. 2 and 24) is mounted on shaft 252, with its starting point at the correct position relative to cam follower 17, the machine is set up as before, and the switch 102 is thrown to forward position. The path of the dome 27 which is caused by the cam and follower can be observed on scale 261 and again increments of movement of the dome can be manually applied by turning knob 33 to correct errors.

Where automatic correction is utilized, a master potentiometer of desired characteristics is also mounted to move with cam 77, the starting or zero positions being matched before the run. The master potentiometer will then be tracked with the potentiometer being wound on form 1 and any of out-of-balance can be applied to servomotor 86 to automatically shift the dome in such way as to correct for such detected errors, as previously described.

While the herein described novel and useful invention has been specifically disclosed in connection with the drawings herewith presented of an operating machine showing embodiments of the invention, it is obvious that departures from the specific structure can be made without modifying the method or apparatus basically needed to perform the winding of a form into a wound component and such basic requirements comprise in combination a plurality of grippers adapted to fixedly support a form to be wound in one plane; a shuttle; rotating means for revolving said shuttle bodily around the form in said plane; rotating means for rotating said shuttle in a second plane normal to said first plane and relative to the fixed form; a source of rotative power; driving connections between said source of power and said two rotating means for operating the shuttle in its two planes of rotation in a preselected speed ratio between the two degrees of rotation; and automatic means acting in synchronism with the rotative movements of said shuttle in said first plane, to periodically and successively remove each gripper out of the path of movement of said shuttle in said first plane, to allow passage of said shuttle, and replace said grippers in said path of movement successively after passage of the shuttle thereby.

Furthermore, the invention is specifically concerned with a method of precise winding substantially employing the steps of maintaining a form in fixed position in one plane throughout the winding cycle; traversing angularly around the form in that plane with a supply of filamentary material while simultaneously rotating the supply in a plane normal to the first plane; controlling the speeds of rotation in the two directions at a constant speed; and separately varying the speed of rotation in the second plane by a derivative obtained from a variable speed function.

Obviously, in practicing the present invention many modifications will be apparent within the spirit and scope of the disclosure.

For example, the escapement-governor-control mechanism referred to can be otherwise formed as a separate speed governor for the prime mover and a conventional variable speed drive.

Furthermore, this escapement mechanism does not have to utilize a dome and rider but any form of variable speed drive can be sustituted therefor without essentially changing the functioning thereof.

The dome and rider used for controlling the axial speed of the shuttle can also be replaced by any conventional variable speed drive, or, in some cases, this and the auxiliary motor drive can be dispensed with entirely, utilizing gear changes to alter the relationship of shuttle axial speed to angular speed.

In the same way, the axial speed of the shuttle can be held at a constant speed with increments of variability being applied to the angular movements of the head carrying the shuttle, by using a variable speed drive and auxiliary motor to boost the speed of rotation of the cam plate and head.

Furthermore, other gripper means for holding the form, and operating means to progressively move the grippers from the angular path travelled by the shuttle may be employed than those specifically illustrated.

Although I have shown preferred forms of my invention, and the manner in which they operate, it will be apparent to those skilled in the art that various modifications and changes may be made therein without departing from the spirit and scope of my invention within the spirit and scope of the appended claims, and that the winding machine according to my invention, as described and claimed, can be utilized for the production of wound forms or cores, without limit to size or capacity, and for any ultimate use, beyond the specified and exemplified uses hereinbefore given.

I claim:

1. A winding machine of the type described comprising in combination; a plurality of grippers adapted to fixedly support a form to be wound in one plane; a shuttle; rotating means for revolving said shuttle bodily around the form in said plane; rotating means for rotating said shuttle in a second plane normal to said first plane and relative to the fixed form; a source of rotative power; driving connections between said source of power and said two rotating means for operating the shuttle in its two planes of rotation in a preselected speed ratio between the two degrees of rotation; and automatic means acting in synchronism with the rotative movements of said shuttle in said first plane, to periodically and successively remove each gripper out of the path of movement of said shuttle in said first plane, to allow passage of said shuttle, and replace said grippers in said path of movement successively after passage of the shuttle thereby.

2. A winding machine of the type described comprising in combination; a plurality of grippers adapted to fixedly support a form to be wound in one plane; a shuttle; rotating means for revolving said shuttle bodily around the form in said plane; rotating means for simultaneously rotating said shuttle in a second plane normal to said first plane and relative to the fixed form; a prime mover; driving connections between said prime mover and said two rotating means operating the shuttle in its two planes of rotation in a preselected speed ratio between the two degrees of rotation; an auxiliary source of rotative power additively acting upon the rotating means for rotating the shuttle in said second plane; a variable speed control mechanism controlling the output of said auxiliary power, whereby to vary the speed of rotating in the first plane; and automatic means driven by said prime mover and acting in synchronism with the rotative movements of said shuttle in said first plane to periodically and successively remove each gripper from active gripping connection with the form out of the path of movement of said shuttle in said first plane, to allow passage of said shuttle and replace said grippers into active gripping connection with the form successively after passage of the shuttle thereby.

3. A winding machine of the type described comprising in combination a plurality of grippers adapted to fixedly support a form to be wound in one plane by gripping said form in a plane normal to the first plane; a shuttle carrying a supply of filamentary material to be wound on the form; rotating means for revolving said shuttle bodily in a circular path around the form in said plane; rotating means for rotating said shuttle in said second plane normal to said first plane and relative to the fixed form, for winding turns of the filamentary material thereon; a prime mover; driving connections between said prime mover and said two rotating means operating the shuttle in its two planes of rotation in a preselected speed ratio between the two degrees of rotation; an auxiliary source of rotative power additively acting upon the rotating means for rotating the shuttle in said second plane; a variable speed control mechanism controlling the output of said auxiliary power; whereby to vary the speed of rotation in said second plane relative to the speed of rotating in the first plane; speed control means acting to govern the speed of rotation of the shuttle in said two planes irrespective of the torque being supplied by the prime mover; automatic means driven by said prime mover and acting in synchronism with the rotative movements of said shuttle in said first plane, to periodically and successively remove each gripper from active gripping connection with the form out of the path of movement of said shuttle in said first plane, to allow passage of said shuttle; and automatic means to replace said grippers into active gripping connection with the form successively after passage of the shuttle thereby.

4. A winding machine of the type described comprising in combination a plurality of grippers each having a pair of cooperating fingers adapted to fixedly support and axially grip a form to be wound in one plane; a shuttle carrying a supply of wire to be wound on the form; rotating means for revolving said shuttle bodily in a circular path around the form in said plane; rotating means for rotating said shuttle in a second plane normal to said first plane and relative to the fixed form, for winding turns of the wire thereon; a prime mover; driving connections between said prime mover and said two rotating means operating the shuttle in its two planes of rotation in a preselected speed ratio between the two degrees of rotation; an auxiliary source of rotative power additively acting upon the rotating means for rotating the shuttle in said second plane; a variable speed control mechanism controlling the output of said auxiliary power, whereby to vary the speed of rotation in said second plane relative to the speed of rotating in the first plane; speed control means acting to govern the speed of rotation of the shuttle in said two planes irrespective of the torque being supplied by the prime mover; and automatic means acting in synchronism with the rotative movements of said shuttle in said first plane, to periodically and successively remove each gripper from active gripping connection with the form out of the path of movement of said shuttle in said first plane, to allow passage of said shuttle, and replace said grippers into active gripping connection with the form successively after passage of the shuttle thereby, said automatic m is including a cam driven by said prime m ar and a cam follower for each gripper acting through linkage to open or close the fingers of each gripper under control of the contour of the cam axially with respect to the form.

5. A winding machine of the type described comprising in combination a plurality of grippers adapted to fixedly support a form to be wound in one plane; a shuttle; rotating means for revolving said shuttle bodily in a circular path around the form in said plane; rotating means for rotating said shuttle in a second plane normal to said first plane and relative to the fixed form, a prime mover; driving connections between said prime mover and said two rotating means to operate the shuttle in its two planes of rotation in a preselected speed ratio between the two degrees of rotation; a variable speed control mechanism for varying the speed of rotation in said second plane relative to the speed of rotating in the first plane; speed control means acting to govern the speed of rotation of the shuttle in said two planes irrespective of the torque being supplied by the prime mover; and automatic means driven by said prime mover and acting in synchronism with the rotative movements of said shuttle in said first plane, to periodically and successively remove each gripper from active gripping connection with the form out of the path of movement of said shuttle in said first plane, to allow passage of said shuttle, and replace said grippers into active gripping connection with the form successively after passage of the shuttle thereby.

6. A winding machine of the type described comprising in combination a plurality of grippers each having a pair of cooperating fingers adapted to fixedly support a toroidal form to be wound in one plane by pressure in an axial direction on the form; a shuttle carrying a supply of filamentary material to be wound on the form; rotating means for revolving said shuttle bodily around the form in said plane; rotating means for rotating said shuttle axially in a second plane normal to said first plane and relative to the fixed form, for winding turns of the filamentary material thereon; a main motor; driving connections between said motor and said rotating means for rotating the shuttle bodily in its first plane of rotation; speed control means acting to govern the speed of rotation of the shuttle in said two planes irrespective of the torque being supplied by said motor; a cam plate driven by said motor in synchronism with the rotative movements of said shuttle in said first plane; a cam follower for each gripper acting through linkage to periodically and successively open said fingers of each gripper from active gripping connection with the form and move them out of the path of movement of said shuttle in said first plane, to allow passage of said shuttle, and replace said fingers into active gripping connection axially with the form successively after passage of the shuttle thereby; an auxiliary motor drivingly connected to said rotating means for rotating said shuttle axially and to a friction rider; a spherical dome in frictional contact with said rider and rotated from said main motor, whereby said shuttle will be rotated axially in accordance with the combined rotational speed of the two motors; and means for changing the position of rider and dome to alter the speed of rotation of the shuttle axially including a sector connected to said dome; a worm acting upon said sector to swing said dome in an arcuate path relative to said rider; and an operating handle for rotating said worm.

7. A winding machine of the type described comprising in combination a plurality of grippers each having a pair of cooperating fingers adapted to fixedly support a form to be wound in one plane; a shuttle carrying a supply of filamentary material to be wound on the form; rotating means for revolving said shuttle bodily around the form in said plane; rotating means for rotating said shuttle axially in a second plane normal to said first plane and relative to the fixed form, for winding turns of the filamentary material thereon; a main motor; driving connections between said motor and said rotating means for rotating the shuttle bodily in its first plane of rotation; speed control means acting to govern the speed of rotation of the shuttle in said two planes irrespective of the torque being supplied by said motor; a cam plate driven by said motor in synchronism with the rotative movements of said shuttle in said first plane; a cam follower for each gripper acting through linkage to periodically and successively open said fingers of each gripper from active gripping connection with the form and move them out of the path of movement of said shuttle in said first plane, to allow passage of said shuttle and replace said fingers into active gripping connection with the form successively after passage of the shuttle thereby; an auxiliary motor drivingly connected to said rotating means for rotating said shuttle axially and to a friction rider; a spherical dome in frictional contact with said rider and rotated from said main motor, whereby said shuttle will be rotated axially in accordance with the combined rotational speed of the two motors; and means for automatically changing the position of rider and dome to alter the speed of rotation of the shuttle axially; including a cam adapted to be driven from said first motor; and a cam follower driving a worm to move a sector connected to said dome to swing the dome in an arcuate path determined in magnitude and sense by the cam contour.

8. A winding machine of the type described comprising in combination a plurality of grippers lying in the same plane each formed of a pair of fingers pivotally movable toward and away from each other to grip a form to be wound in an axial direction between them when in closed position; an operating cam follower member for each gripper for actuating the opening and closing of the fingers thereof; a rotatable cam having a cam groove shaped to act upon said cam followers in succession to operate the fingers of each gripper progressively to first open them, then maintain them open for a selected period of time, then close them and thereafter maintain them closed until reopening is desired; a shuttle for winding wire onto the form; rotating means for revolving the shuttle angularly around the form past said grippers as they open successively and at a speed in synchronism with the speed of rotation of said cam; driving means for rotating said shuttle on its axis to wind turns of wire on the form; and a variable speed control drive for rotating said shuttle axially at a desired winding speed to space the turns around the form in a predetermined pattern.

9. A winding machine of the type described comprising in combination a plurality of grippers lying in the same horizontal plane each formed of a pair of fingers pivotally movable toward and away from each other to axially grip a form to be wound between them when in closed position; an operating cam follower member for each gripper for actuating the opening and closing of the fingers thereof; a rotatable cam having a cam groove shaped to act upon said cam followers in succession to operate the fingers of each gripper progressively to first open them, then maintain them open for a selected period of time, then close them and thereafter maintain them closed until reopening is desired; constant speed driving means for rotationally driving the cam; a shuttle for winding wire from a supply carried thereby onto the form; a head supporting said shuttle rotatively; constant speed rotating means for revolving the head angularly around the form on a vertical axis past said grippers as they open successively and at a speed in synchronism with the speed of rotation of said cam; guides in said head for permitting rotation of said shuttle on its horizontal axis to wind turns of wire on the form; driving means for rotating said shuttle axially; and a variable speed drive for controlling said axial rotation to provide a desired winding speed and thereby space the turns around the form in a predetermined pattern.

10. A winding machine of the type described comprising in combination a plurality of grippers lying in the same plane each formed of a pair of fingers pivotally movable toward and away from each other to grip a form to be wound between them when in closed position; an operating cam follower member for each gripper for actuating the opening and closing of the fingers thereof; a rotatable cam having a cam groove shaped to act upon said cam followers in succession to act upon the fingers of each gripper progressively to first open them, then maintain them open for a selected period of time, then close them and thereafter maintain them closed until reopening is desired; a prime mover; driving means for rotationally driving the cam from said prime mover; a shuttle for winding wire from a supply carried thereby onto the form; rotating means drivingly connected with said prime mover for revolving the shuttle angularly around the form past said grippers as they open successively and at a speed in synchronism with the speed of rotation of said cam; driving means operated from said prime mover for rotating said shuttle on its axis to wind turns of wire on the form; and a variable speed control drive between said prime mover and said driving means for rotating said shuttle axially at a desired winding speed to space the turns around the form in a predetermined pattern comprising, a dome driven from said prime mover; a rider in frictional contact with said dome and driven from an auxiliary source of power; driving connections between said rider and said driving means for axially rotating said shuttle; and means for swinging the dome relative to the rider, to vary the speed ratio therebetween.

11. A winding machine of the type described comprising in combination a plurality of grippers lying in the same horizontal plane each formed of a pair of fingers pivotally upon a common pivot pin and movable toward and away from each other to grip a form to be wound between them when in closed position; an operating arm for each finger pivotally attached thereto at the upper end at equidistant points relative to said pivot pin; a common shaft mounting the lower end of said arms; a yoke supporting said shaft; an operating cam follower member for each gripper; linkage between said cam follower and said yoke for actuating the opening and closing of the fingers thereof by longitudinally moving said arms; a rotatable cam having a cam groove shaped to act upon said cam followers in succession to act upon said arms to move them to progressively to first open the fingers, then maintain them open for a selected period of time, then close them and maintain them closed until reopening is desired; driving means for rotationally driving the cam; a shuttle for winding wire from a supply carried thereby onto the form; rotating means for revolving the shuttle angularly around the form on a vertical axis past said fingers as they open successively and at a speed in synchronism with the speed of rotation of said cam; and driving means for rotating said shuttle on its horizontal axis to wind turns of wire on the form.

12. A winding machine of the type described comprising in combination a plurality of grippers lying in the same horizontal plane each formed of a pair of fingers pivotally movable toward and away from each other to grip a form to be wound between them when in closed position; an operating cam follower for each gripper for actuating the opening and closing of the fingers thereof; a circular cam plate rotatable on its vertical axis and having a cam groove shaped with a major portion concentric with the plate and a minor U-shaped portion to operate said cam followers in succession to act upon the fingers of each gripper progressively to first open them, then maintain them open for a selected period of time, then close them utilizing the U-shaped portion and thereafter maintain them closed by the concentric portion until reopening is desired; a peripheral worm gear on the cam plate; a worm meshing therewith constituting a driving means for rotationally driving the cam; a shuttle for winding wire onto the form; a head removably supporting the shuttle; rotating means for revolving the head on the vertical axis of the cam plate angularly around the form comprising a worm gear driving said head and a worm meshing with the worm gear; a prime mover geared to drive said two worms to rotate said head in synchronism with the speed of rotation of said cam; driving means for rotating said shuttle on its horizontal axis to wind turns of wire on the form in part from said prime mover and in part from an auxiliary motor; and a variable speed control drive between said prime mover and auxiliary motor and said driving means for rotating said shuttle axially, to vary and control the winding speed thereof and space the turns angularly around the form in a predetermined pattern.

13. A winding machine as claimed in claim 12 wherein said variable speed control comprises a member driven by said prime mover; a friction rider in contact with the revolving surface of said member driven by said auxiliary motor; gearing connecting the output thereof to the driving means rotating the shuttle axially; mounting means for rotatably supporting said member; and manual means including a worm driving a worm gear operatively attached to said mounting means for moving said member in a path relative to said rider, to alter the speed ratio.

14. A winding machine of the type described comprising in combination a plurality of grippers lying in the same horizontal plane each formed of a pair of fingers pivotally movable toward and away from each other to grip a form to be wound between them when in closed position in said horizontal plane; operating cam followers for actuating the grippers to open and close the fingers thereof; a circular rotatable cam plate having a cam groove shaped to act upon said cam followers to operate the fingers of each gripper progressively to first open them, then maintain them open for a selected period of time, then maintain them closed until reopening is desired; constant speed driving means for rotationally driving the cam from a prime mover; a shuttle for winding wire from a supply carried thereby onto the form; a rotating head removably carrying the shuttle carried by a vertical column; constant speed rotating means for revolving the column angularly around the form on a vertical axis to move said head past said grippers as they open successively driven from said prime mover and at a speed in synchronism with the speed of rotation of said cam plate; driving means including a vertical shaft rotatively carried by said column for rotating said shuttle on its horizontal axis to wind turns of wire on the form; and a variable speed control drive for rotating said vertical shaft including a part driven from said prime mover; another part in frictional contact with the first part and driven from an auxiliary source of power, means for moving the two parts relative to each other to alter the driving ratio between them, and driving connections including a differential chain of gears for applying the torque supplied by said second part to said vertical shaft, whereby to drive said shuttle axially at a selected speed and govern said speed relative to the speed of the machine as a whole.

15. A winding machine of the type described comprising in combination a plurality of grippers for supporting a form upon which is to be wound filamentary material; a shuttle adapted to embrace the form and carrying a supply of filamentary material to be wound on the form; a head supporting the shuttle for rotation on its axis to wind coils of said filamentary material on the form, said head being mounted for rotation about a vertical axis; means for rotating said head to bodily carry the shuttle angularly around the form and space said coils thereon; means for rotating said shuttle on its axis; a prime mover for operating both of said rotating means; a variable speed drive between said prime mover and said means for axially rotating the shuttle; an auxilary driving means for also driving said means for axially rotating the shuttle; means for manually changing the driving ratio of said variable speed drive to alter the angular spacing of said coils; a variable speed controlling governor for controlling the speed of said prime mover and thereby vary the speed of the winding cycle of the machine; means operable under control of the prime mover and in synchronism with the rotation of said head for progressively releasing said grippers from the form and removing them from the path of movement of said head, to permit its passage thereby; and means for closing said grippers onto the form progressively after the passage of the head thereby.

16. A winding machine of the type described comprising in combination a plurality of grippers for supporting a toroidal form upon which wire is to be wound by applying axial pressure thereon; an annular shuttle splittable to embrace the form and lockable thereafter and removably carrying a supply of wire to be wound on the form; a head supporting the shuttle for rotation on its axis to wind coils of said filamentary material on the form, said head being integrally mounted on a column for rotation about a vertical axis; means for rotating said column and head about its vertical axis to bodily carry the shuttle angularly around the form and space said coils thereon; means for rotating said shuttle on its horizontal axis; a prime mover for operating both of said rotating means; a variable speed drive between said prime mover and said means for axially rotating the shuttle; an auxiliary driving means for applying a derivative of speed to said means for axially rotating the shuttle; means for changing the driving ratio of said variable speed drive, to alter the angular spacing of said coils; a variable speed device for controlling the speed of said prime mover, to thereby vary the speed of the winding cycle of the machine; means operable under control of the prime mover and in synchronism with the rotation of said head and column for progressively releasing said grippers from the form and removing them from the path of movement of said head, to permit its passage thereby and for closing said grippers onto the form progressively after the passage of the head thereby; and a constant speed governor device between said prime mover and all said rotating means driven thereby.

17. A winding machine of the type described comprising in combination a plurality of grippers for supporting a form upon which wire is to be wound; a shuttle adapted to embrace the form and removably carrying a supply of wire to be wound on the form; a head removably supporting the shuttle for rotation on its axis to wind coils of said filamentary material on the form, said head being mounted for rotation about a vertical axis; means for rotating said head about its vertical axis to bodily carry the shuttle angularly around the form and space said coils thereon; means for rotating said shuttle on its axis; a prime mover for operating both of said rotating means; a variable speed drive between said prime mover and said means for axially rotating the shuttle; an auxiliary driving means for also driving said means for axially rotating the shuttle; a variable speed controlling governor for controlling the speed of said prime mover and thereby vary the speed of the winding cycle of the machine; means operable under control of the prime mover and in synchronism with the rotation of said head for progressively releasing said grippers from the form and removing them from the path of movement of said head, to permit its passage thereby and for closing said grippers onto the form progressively after the passage of the head thereby; means for changing the driving ratio of said variable speed drive by infinite increments of magnitude and sense during the winding cycle of the machine under control of a cam rotated from said prime mover in a speed relationship with the speed of rotation of the machine; and a cam follower adapted to be driven by said cam to directly apply the changes of speed necessary to wind a form with a preselected non-linear pattern.

18. A winding machine of the type described comprising in combination a circular cam plate having peripheral worm gear teeth and a cam groove in one face thereof; driving means including a worm for revolving said plate in a horizontal plane; a plurality of cam followers each in contact with the cam groove at all times and operated thereby to assume positions dependent upon the shape of the cam groove; a plurality of grippers of same number as said cam followers, each comprising a pair of fingers hingedly associated to be opened wide and spaced apart from each other or to be closed tightly together, on a form to be wound to fixedly grip same therebetween; connections between said cam followers and said grippers including a spring urged arm for each finger adapted to apply to resilient pressure on said form when the fingers grip same, said connections permitting said cam followers to open said fingers in succession, close them after a time interval and maintain them closed until a further opening, all said movements being determined by the shape of said cam groove; a shuttle; means to rotate said shuttle axially in one plane; means to bodily rotate said shuttle in another plane and in a path interfering with said grippers; and means to synchronize the successive opening of said fingers of the grippers with the rotation bodily of said shuttle in such manner that each gripper will have its fingers removed from the interference path in succession to allow passage of said shuttle thereby.

19. A winding machine of the type described comprising in combination a circular cam plate having peripheral worm gear teeth and a cam groove in one face thereof; driving means including a worm for revolving said plate in a plane; a plurality of cam followers each in contact with the cam groove at all times and operated thereby to assume positions dependent upon the shape of the cam groove; a plurality of grippers of same number as said cam followers, each comprising a pair of fingers hingedly associated to be opened wide and spaced apart from each other or to be closed tightly together on a form to be wound to fixedly grip same axially therebetween; connections between said cam followers and said grippers, said connections permitting said cam followers to open said fingers in succession, close them after a time interval, and maintain them closed until a further opening, all said movements being determined by the shape of said cam groove; a shuttle; means to rotate said shuttle axially in one plane; means to bodily rotate said shuttle in another plane and in a path interfering with said grippers; means to synchronize the successive opening of said fingers of the grippers with the rotation bodily of said shuttle in such manner that each gripper will have its fingers removed from the interference path in succession to allow passage of said shuttle thereby; a prime mover drivingly connected to drive said worm for revolving said plate; a worm for rotating a head carrying said shuttle bodily around the form in synchronism; and a constant speed governor device for controlling the speed of said prime mover.

20. A winding machine of the type described comprising in combination; a plurality of grippers adapted to fixedly support a form to be wound in one plane; a shuttle; rotating means for revolving said shuttle bodily around the form in said plane; rotating means for rotating said shuttle in a second plane normal to said first plane and relative to the fixed form; a source of rotative power; driving connections between said source of power and said two rotating means for operating the shuttle in its two planes of rotation in a preselected speed ratio between the two degrees of rotation; automatic means acting in synchronism with the rotative movements of said shuttle in said first plane, to periodically and successively remove each gripper out of the path of movement of said shuttle in said first plane to allow passage of said shuttle and replace said grippers in said path of movement successively after passage of the shuttle thereby; each of said grippers comprising an upper and a lower finger; operating arms therefor; adjustable spring pressure means acting on each arm to normally urge the fingers into open position; an extension on the lower finger acting against an abutment; an adjuster for each spring pressure means whereby each lower finger can be spring loaded against its abutment to present a relatively unyielding platform of lower fingers in an exact plane parallel to said first plane on which a form may be laid; and latching means associated with each upper finger whereby each upper flange may be unlatched and removed from contact with the form to align the form on the lower finger and can thereafter be latched into contact with the form, to grip same in cooperation with the lower finger of its grippers.

21. A winding machine of the type described comprising in combination; a plurality of grippers adapted to fixedly support a form to be wound in one plane; a shuttle; rotating means for revolving said shuttle bodily around the form in said plane; rotating means for rotating said shuttle in a second plane normal to said first plane and relative to the fixed form; a source of rotative power; driving connections between said source of power and said two rotating means for operating the shuttle in its two planes of rotation in a preselected speed ratio between the two degrees of rotation; automatic means acting in synchronism with the rotative movements of said shuttle in said first plane, to periodically and successively remove each gripper out of the path of movement of said shuttle in said first plane to allow passage of said shuttle and replace said grippers in said path of movement successively after passage of the shuttle thereby; said shuttle being of annular shape and having a peripheral gear thereon and a part of the annular shuttle being displaceable for embracing the form, replaceable thereafter and lockable in replaced condition; and said means for rotating said shuttle in said second plane including a driven spur gear meshing with said annular gear on the shuttle.

22. A winding machine of the type described comprising in combination; a plurality of grippers adapted to fixedly support a form to be wound in one plane; a shuttle; rotating means for revolving said shuttle bodily around the form in said plane; rotating means for rotating said shuttle in a second plane normal to said first plane and relative to the fixed form; a source of rotative power; driving connections between said source of power and said two rotating means for operating the shuttle in its two plane of rotation in a pre-selected speed ratio between the two degrees of rotation; automatic means acting in synchronism with the rotative movements of said shuttle in said first plane, to periodically and successively remove each gripper out of the path of movement of said shuttle in said first plane to allow passage of said shuttle and replace said grippers in said path of movement successively after passage of the shuttle thereby; and automatic means for varying the speed of rotation of the shuttle axially without altering the speed of rotation of the rest of the machine comprising a cam driven from the source of rotative power, a cam follower, a pivotally mounted dome, gearing rotating said dome from said source of rotative power, connections between said cam follower and dome to cause the dome to swing in an arcuate path in the magnitude and direction dictated by said cam, a friction rider on said dome, an auxiliary source of rotative power driving said rider, and driving connections between said rider and said rotating means for rotating the shuttle in said second plane, whereby a non-linear pattern may be wound on the form.

23. A winding machine of the type described comprising in combination a plurality of grippers adapted to fixedly support a form to be wound in one plane; a shuttle; rotating means for revolving said shuttle bodily around the form in said plane; rotating means for rotating said shuttle in a second plane normal to said first plane and relative to the fixed form; a source of rotative power; driving connections between said source of power and said two rotating means for operating the shuttle in its two planes of rotation in a preselected speed ratio between the two degrees of rotation; automatic means acting in synchronism with the rotative movements of said shuttle in said first plane, to periodically and successively remove each gripper out of the path of movement of said shuttle in said first plane to allow passage of said shuttle and replace said grippers in said path of movement successively after passage of the shuttle thereby; automatic means for varying the speed of rotation of the shuttle axially without altering the speed of rotation of the rest of the machine comprising a cam driven from the source of rotative power; a cam follower; a pivotally mounted dome; gearing rotating said dome from said source of rotative power; connections between said cam follower and dome to cause the dome to swing in an arcuate path in the magnitude and direction dictated by said cam; a friction rider on said dome; an auxiliary source of rotative power driving said rider; driving connections between said rider and said rotating means for rotating the shuttle in said second plane, whereby a non-linear pattern may be wound on the form; and means for automatically introducing an incremental change of position of said dome to correct for an error detected in the non-linear pattern during winding comprising a servomotor adapted to receive a signal equivalent to an error detected, and a gear train operating in magnitude and direction thereby in accordance with the correction required upon the pivotable dome to move same during the winding cycle irrespective of the movements progressively imparted thereto by the cam follower.

24. A winding machine of the type described comprising in combination a plurality of grippers adapted to fixedly support a form to be wound in one plane; a shuttle; rotating means for revolving said shuttle bodily around the form in said plane; rotating means for rotating said shuttle in a second plane normal to said first plane and relative to the fixed form; a source of rotative power; driving connections between said source of power and said two rotating means for operating the shuttle in its two planes of rotation in a pre-selected speed ratio between the two degrees of rotation; automatic means acting in synchronism with the rotative movements of said shuttle in said first plane, to periodically and successively remove each gripper out of the path of movement of said shuttle in said first plane to allow passage of said shuttle and replace said grippers in said path of movement successively after passage of the shuttle thereby; automatic means for varying the speed of rotation of the shuttle axially without altering the speed of rotation of the rest of the machine comprising a cam driven from the source of rotative power; a cam follower; a pivotally mounted dome; gearing rotating said dome from said source of rotative power; connections between said cam follower and dome to cause the dome to swing in an arcuate path in the magnitude and direction dictated by said cam; a friction rider on said dome; an auxiliary source of rotative power driving said rider; driving connections between said rider and said rotating means for rotating the shuttle in said second plane, whereby a non-linear pattern may be wound on the form; and means for automatically introducing an incremental change of position of said dome to correct for an error detected in the non-linear pattern during winding comprising a servomotor adapted to receive a signal equivalent to an error detected; a gear train operating in magnitude and direction thereby in accordance with the correction required upon the pivotable dome to move same during the winding cycle irrespective of the movements progressively imparted thereto by the cam follower; a pointer moving with the dome; a pointer moving with said gear train; and a scale with a common zero over which said pointers swing to indicate the degree of correction effected.

25. A winding machine for making a wire-wound electrical component such as a potentiometer comprising in combination a plurality of grippers each comprising a pair of cooperating fingers spaced around a circumference and projecting radially toward the center of said circumference to grip and hold axially between the fingers a form to be wound in concentric position therewith; a hollow supporting column rotatably mounted to revolve on a vertical axis concentric with said circumference; a head integral with said column adapted to rotatably support a shuttle having a supply of wire to be wound on the form; a peripheral worm gear mounted on said column; a worm mounted on a main drive shaft and meshing with said worm gear; a prime mover drivingly connected to rotate said main shaft; a cam plate freely mounted about said column; a shaped cam groove in one face of said cam plate; a peripheral worm gear on said cam plate; a second worm meshing with said worm gear; a second shaft mounting said second worm; gears connecting said main shaft and said second shaft, whereby said cam plate and said column move in synchronism; a plurality of cam followers each on a swingable operating yoke, one each for each gripper; connections between said followers and said fingers to progressively open the grippers, whereby said head may pass by them in succession under urge of said cam groove; a vertical shaft rotatably mounted inside the hollow column and projecting through at each end; driving means at the upper end below said head for rotating a shuttle in the head on its horizontal axis; gearing at the lower end to rotate said vertical shaft; and variable speed driving means for said gearing for rotating said vertical shaft, including an auxiliary motor and a variable speed device controlling the speed of rotation of the said main shaft; the auxiliary motor and main shaft jointly driving said vertical shaft at a speed composed of the additive speeds thereof.

26. A winding machine for making a wire-wound electrical component such as a potentiometer comprising in combination a plurality of grippers each comprising a pair of cooperating fingers spaced at equal distances around a circumference to grip and hold between the fingers a toroidal form, to be wound in concentric position therewith; a hollow supporting column rotatably mounted to revolve on a vertical axis concentric with said circumference; a head integral with said column adapted to rotatably support a shuttle having a supply of wire to be wound on the form; a peripheral worm gear mounted on said column; a worm mounted on a main drive shaft and meshing with said worm gear; a prime mover drivingly connected to rotate said main shaft; a cam plate freely mounted about said column; a shaped cam groove in one face of said cam plate, a major portion of which is generated as concentric with said circumference with another U-shaped portion eccentric thereof; a peripheral worm gear on said cam plate; a second worm meshing with said worm gear; a second shaft mounting said second worm; gears connecting said main shaft and said second shaft, whereby said cam plate and said column move in synchronism; a plurality of cam followers each on a swingable operating yoke one each for each gripper; operating arms for each finger; a common pin for each pair of arms; a fork for supporting said pin; toggle linkage between each fork and each swingable operating yoke; whereby in the concentric portion of the cam groove the cam followers keep the fingers closed against the resilient pressure of the spring and in the U-shaped portion, the cam followers on the one side permit opening of the fingers, in the flat keep them open, and on the side close the fingers; a vertical shaft rotatably mounted inside the hollow column and projecting through at each end; driving means at the upper end below said head for rotating a shuttle in the head on its horizontal axis; gearing at the lower end to rotate said vertical shaft; variable speed driving means for said gearing including a gear train from said main shaft rotating a dome, a pivoted mounting bracket rotatably supporting said dome, a rider on the surface of said dome, an auxiliary motor rotating said rider, a shaft supporting said rider, a gear on said shaft connecting drivingly with said gearing at the end of the vertical shaft, to rotate said shaft in accordance with the combined speed of said prime mover and auxiliary motor; and means for swinging said dome relative to its rider in an arcuate path about said pivoted mounting.

27. A winding machine for making a wire wound electrical component such as a potentiometer comprising in combination a plurality of grippers each comprising a pair of cooperating fingers spaced at equal distances around a circumference to axially grip and hold between the fingers a toroidal form to be wound in concentric position therewith; a hollow supporting column rotatably mounted to revolve on a vertical axis concentric with said circumference; a head integral with said column adapted to rotatably support a shuttle having a supply of wire to be wound on the form; a peripheral worm gear mounted on said column; a worm mounted on a main drive shaft and meshing with said worm gear; a prime mover drivingly connected to rotate said main shaft; a cam plate freely mounted about said column; a shaped cam groove in one face of said cam plate, a major portion of which is generated as concentric with said circumference with another U-shaped portion eccentric thereof; a peripheral worm gear on said cam plate; a second worm meshing with said worm gear; a second shaft mounting said second worm; gears connecting said main shaft and said second shaft, whereby said cam plate and said column move in synchronism; a plurality of cam followers comprising ball bearing rollers each on a swingable operating yoke one each for each gripper; hollow operating arms for each finger; a common pin for each pair of arms; a fork for supporting said pin; toggle linkage between each fork and each swingable operating yoke, whereby in the concentric portion of the cam groove, the cam followers keep the fingers closed against the resilient pressure of the spring and in the U-shaped portion, the cam followers on the one side permit opening of the fingers, in the flat keep them open, and on the side close the fingers; a vertical shaft rotatably mounted inside the hollow column and projecting through at each end; driving means at the upper end below said head for rotating a shuttle guidingly held in the head on its horizontal axis; gearing at the lower end to rotate said vertical shaft; variable speed driving means for said gearing including a gear train from said main shaft rotating a dome; a pivoted mounting bracket rotatably supporting said dome; a rider on the surface of said dome; an auxiliary motor rotating said rider; a shaft supporting said rider; a gear on said shaft connecting drivingly with said gearing at the end of the vertical shaft through a differential train of gears, to rotate said shaft in accordance with the combined speed of said prime mover and auxiliary motor; a constant speed control device controlling the output of said prime mover through said main shaft; a variable speed device controlling the speed of rotation of the said main shaft; a counter operated from gearing on said vertical shaft to indicate the number of turns of wire wound on the form; an angular spacing counter driven by gearing from said main shaft; and means for automatically swinging said dome in an arcuate path relative to its rider about said mounting including a cam, a cam follower, a sector mounted to move said dome, and worm driven by said cam follower.

28. A winding machine for making a wire-wound electrical component such as a potentiometer comprising in combination a plurality of grippers each comprising an upper and a lower finger spaced at equal distances around a circumference and projecting radially toward the center of said circumference to axially grip and hold between the fingers a toroidal form, to be wound in concentric position therewith; an abutment for each lower finger; resilient means spring loading said lower fingers against said abutment; latching means acting to releasably latch said upper fingers relative to said lower fingers; a hollow supporting column rotatably mounted to revolve on a vertical axis concentric with said circumference; a head integral with said column adapted to rotatably support a shuttle having a supply of wire to be wound on the form; a peripheral worm gear mounted on said column; a worm mounted on a main drive shaft and meshing with said worm gear; a prime mover drivingly connected to rotate said main shaft; a cam plate freely mounted about said column; a shaped cam groove in one face of said cam plate, a major portion of which is generated as concentric with said circumference with another U-shaped portion eccentric thereof; a peripheral worm gear on said cam plate; a second worm meshing with said worm gear; a second shaft mounting said second worm; gears connecting said main shaft and said second shaft, whereby said cam plate and said column move in synchronism; a plurality of cam followers each on a swingable operating yoke one each for each gripper; hollow operating arms for each finger; resilient means including an internally held spring within the hollow arm for urging the fingers into open position; a common pin for each pair of arms; a fork for supporting said pin; toggle linkage between each fork and each swingable operating yoke, whereby in the concentric portion of the cam groove, the cam followers keep the fingers closed against the resilient pressure of the spring and in the U-shaped portion, the cam followers on the one side permit opening of the fingers, in the flat keep them open, and on the side close the fingers; a vertical shaft rotatably mounted inside the hollow column and projecting through at each end; driving means at the upper and below said head for rotating a shuttle guidingly held in the head on its horizontal axis; gearing at the lower end to rotate said vertical shaft; variable speed driving means for said gearing including a gear train from said main shaft rotating a dome; a pivoted mounting bracket rotatably supporting said dome; a rider on the surface of said dome; an auxiliary motor rotating said rider; a shaft supporting said rider; a gear on said shaft connecting drivingly with said gearing at the end of the vertical shaft through a differential train of gears, to rotate said shaft in accordance with the combined speed of said prime mover and auxiliary motor; automatic means for swinging said dome relative to its rider in an arcuate path about said pivoted mounting including a cam and cam follower; a constant speed control device controlling the output of said prime mover through said main shaft; a variable speed device controlling the speed of rotation of the said main shaft; a counter operated from gearing on said vertical shaft to indicate the number of turns of wire wound on the form; an angular spacing counter driven by gearing from said main shaft; and means for introducing corrections for errors in winding a preselected pattern including a servomotor, gearing driven thereby and connections between said gearing and said dome.

29. A winding machine as claimed in claim 25; provided with a plurality of series connected cut-out switches on switch blocks around said circumference; and a plurality of rods adapted to be temporarily carried by said switch blocks to align the form concentrically while cutting off supply of power to the machine, after which the rods are removed to permit the winding cycle to proceed.

30. A winding machine of the type described when used for winding wire on a form with an exact number of turns within a selected angular length on the form, comprising in combination, a plurality of grippers for holding the form fixed in a first plane; a shuttle carrying a supply of wire; rotating means for revolving said shuttle bodily in said plane around the form in said first plane; rotating means for spinning said shuttle on its axis in a second plane normal to said first plane; a cam rotatable in synchronism with said shuttle in its movements in said first plane; cam followers operating to remove said grippers successively from the path of movement of said shuttle in said first plane; a prime mover; gearing drivingly associated with said prime mover to rotate said cam in a plane parallel to said first plane and said shuttle in synchronism with the cam in said first plane; gearing driven by said prime mover to directly rotate said shuttle axially in said second plane, the speeds of rotation of the shuttle in its two planes being at a ratio determined by said gearing; an angular length indicator driven with said cam; and constant speed control means governing the speed output from said prime mover.

31. A winding machine of the type described when used for winding wire on a form with an exact number of turns within a selected angular length on the form comprising in combination a plurality of grippers for holding the form fixed in a first plane; a shuttle; a supply of wire; rotating means for revolving said shuttle bodily in said plane around the form in said first plane; rotating means for spinning said shuttle on its axis in a second plane normal to said first plane; displacing means rotatable in synchronism with said shuttle in its movements in said first plane; to remove said grippers successively from the path of movement of said shuttle in said first plane; a prime mover; gearing drivingly associated with said prime mover to rotate said displacing means and said shuttle in synchronism; gearing driven by said prime mover to directly rotate said shuttle axially in said second plane, the speeds of rotation of the shuttle in its two planes being at a ratio determined by said gearing; and constant speed control means governing the speed output from said prime mover.

32. The method of precise winding a form with filamentary turns of material in a predetermined spaced angular pattern comprising te steps of maintaining a form in fixed position in one plane throughout the winding cycle; traversing angularly around the form in that plane with a supply of filamentary material while simultaneously rotating the supply in a plane normal to the first plane; controlling the speeds of rotation in the two directions at a constant speed; and separately varying the speed of rotation in the second plane by a derivative obtained from a variable speed function.

AMÉDÉE COSTA de BEAUREGARD.

REFERENCES CITED

The following references are of record in the file of this patent:

UNITED STATES PATENTS

| Number | Name | Date |
|---|---|---|
| 1,319,087 | Jacques | Oct. 21, 1919 |
| 1,879,882 | Pullets | Sept. 27, 1932 |
| 1,926,279 | Gray | Sept. 12, 1933 |
| 2,196,463 | Holleran | Apr. 9, 1940 |
| 2,359,132 | Libman | Sept. 26, 1944 |